(12) United States Patent
Isono et al.

(10) Patent No.: US 8,348,354 B2
(45) Date of Patent: Jan. 8, 2013

(54) VEHICLE BRAKING SYSTEM

(75) Inventors: Hiroshi Isono, Mishima (JP); Yasuji Mizutani, Susono (JP)

(73) Assignee: Toyota Jidosha Kabushiki Kaisha, Toyota-shi (JP)

(*) Notice: Subject to any disclaimer, the term of this patent is extended or adjusted under 35 U.S.C. 154(b) by 1329 days.

(21) Appl. No.: 11/997,056

(22) PCT Filed: Aug. 30, 2006

(86) PCT No.: PCT/IB2006/002376
§ 371 (c)(1),
(2), (4) Date: Jan. 28, 2008

(87) PCT Pub. No.: WO2007/026223
PCT Pub. Date: Mar. 8, 2007

(65) Prior Publication Data
US 2008/0185241 A1    Aug. 7, 2008

(30) Foreign Application Priority Data
Aug. 31, 2005 (JP) .................. 2005-252669

(51) Int. Cl.
*B60T 8/60* (2006.01)
(52) U.S. Cl. ............ 303/155; 303/114.1; 303/122.04; 303/122.05
(58) Field of Classification Search ............ 303/155, 303/114.1, 122.04, 122.05
See application file for complete search history.

(56) References Cited

U.S. PATENT DOCUMENTS

| | | | |
|---|---|---|---|
| 6,345,869 B1* | 2/2002 | Matsuo et al. | 303/116.1 |
| 7,014,277 B2 | 3/2006 | Soga | |
| 2001/0006306 A1* | 7/2001 | Kagawa et al. | 303/20 |
| 2001/0020800 A1* | 9/2001 | Isono et al. | 303/113.1 |
| 2002/0117891 A1* | 8/2002 | Harris | 303/20 |
| 2004/0183369 A1 | 9/2004 | Soga | |
| 2006/0163941 A1* | 7/2006 | Von Hayn et al. | 303/155 |

FOREIGN PATENT DOCUMENTS

| DE | 102 44 375 A1 | 1/2004 |
|---|---|---|
| WO | 2005 005214 | 1/2005 |

* cited by examiner

*Primary Examiner* — Bradley King
*Assistant Examiner* — Mahbubur Rashid
(74) *Attorney, Agent, or Firm* — Oblon, Spivak, McClelland, Maier & Neustadt, L.L.P.

(57) ABSTRACT

A vehicle braking system including an input piston and a pressure piston that are moveably supported within a cylinder. The input piston is allowed to depress the pressure piston and is connected to the a brake pedal. Pressure chambers to the front and to the rear of the input piston are communicated through a communication passage such that the control hydraulic pressure in accordance with the operation amount to the brake pedal is applied to the second pressure chamber via first and second linear valves. The control hydraulic pressure in accordance with the operation amount to the brake pedal that has been transmitted to the pressure piston through the input piston is regulated by a pressure regulating valve so as to be applied to the second pressure chamber. The braking hydraulic pressure may be output from the pressure chambers, respectively.

29 Claims, 14 Drawing Sheets

VEHICLE BRAKING SYSTEM

BACKGROUND OF THE INVENTION

1. Field of the Invention

The invention relates to a vehicle braking system for electronically controlling a braking force applied to the vehicle in accordance with a braking amount.

2. Description of Related Art

An electronically controlled braking system has been well known as a braking device for a vehicle that electronically controls the braking force of the braking device, that is, the hydraulic pressure supplied to the wheel cylinder that drives the braking device, in accordance with the braking amount that has been input through the brake pedal. Such braking device has been disclosed in Japanese Patent Application Publication No. JP-A-2004-243983 as described below.

In the vehicle braking system disclosed in Japanese Patent Application Publication No. JP-A-2004-243983, when the driver operates the brake pedal, the master cylinder generates the hydraulic pressure in accordance with the operation amount, and the work fluid partially flows into a stroke simulator such that the operation amount to the brake pedal is adjusted in accordance with the depression force applied to the brake pedal. In the vehicle braking system, the target deceleration of the vehicle is set in accordance with the pedal stroke detected by the brake ECU for determining the distribution of the braking force to the respective wheels such that a predetermined fluid pressure is applied to the respective wheel cylinders.

The vehicle braking control system as described above is provided with a stroke simulator which adjusts the operation amount to the brake pedal by allowing the partial flow of the work fluid to the master cylinder that generates the hydraulic pressure in accordance with the operation amount to the brake pedal. The vehicle braking control system is further provided with a pressurizing mechanism which pressurizes the work fluid supplied to four wheel cylinders via the master cut valve so as to be supplied to the master cylinder in the respective systems. The resultant hydraulic system becomes complicated, thus increasing the manufacturing costs.

In the electronically controlled braking system, the opening degree of the electromagnetic valve is regulated in accordance with the operation amount of the brake pedal so as to apply predetermined fluid pressures to wheel cylinders of the respective wheels. In the case where the battery as the power source installed in the vehicle goes down, the opening degree of the electromagnetic valve cannot be regulated, failing to apply the fluid pressure in accordance with the operation amount to the brake pedal to the wheel cylinders of the respective wheels. In this case, the electronically controlled braking system may be operated using the auxiliary battery provided in the vehicle. This may also cause such problems as the cost increase and deteriorated fuel efficiency owing to the increase in the size and weight of the battery.

DISCLOSURE OF THE INVENTION

It is an object of the invention to provide a vehicle braking system that simplifies the structure and reduces the manufacturing costs as well as improves safety by applying the braking force appropriately even if the power goes down.

According to the invention, a vehicle braking system includes an input piston moveably supported within a cylinder along its axial direction, an operation portion connected to the input piston, a pressure piston provided coaxially with the input piston, moveably supported within the cylinder along the axial direction, which is allowed to be depressed by the input piston, a control hydraulic pressure setting unit that sets a control hydraulic pressure according to an operation amount inputted from the operation portion to the input piston, an electromagnetic hydraulic pressure supply unit that regulates a hydraulic pressure supplied from a hydraulic pressure supply source to the control hydraulic pressure so as to be applied to the input piston and the pressure piston such that a braking pressure is generated, and a mechanical hydraulic pressure supply unit that regulates the hydraulic pressure supplied from the hydraulic supply source to the control hydraulic pressure according to the operation amount transmitted from the operation portion to the pressure piston through the input piston so as to be applied to the pressure piston such that the braking hydraulic pressure is generated.

The vehicle braking system of the invention is provided with the control hydraulic pressure setting unit, the electromagnetic hydraulic pressure supply unit, and the mechanical hydraulic pressure supply unit. The control hydraulic pressure setting unit serves to support the input piston and the pressure piston within the cylinder coaxially such that they are allowed to move along the axial direction, and to allow the input piston to depress the pressure piston such that the control hydraulic pressure may be set in accordance with the operation amount that is input from the operation unit to the input piston. The electromagnetic hydraulic pressure supply unit regulates the hydraulic pressure from the hydraulic pressure supply source to the control hydraulic pressure to operate the input piston and the pressure piston such that the braking hydraulic pressure is generated. The mechanical hydraulic pressure supply unit regulates the hydraulic pressure from the hydraulic pressure supply source to the control hydraulic pressure in accordance with the operation amount that has been transferred from the operation unit to the pressure piston via the input piston such that the pressure piston is operated to generate the braking hydraulic pressure. When the power source is in the normal state, the electromagnetic hydraulic pressure supply unit is driven to apply the control hydraulic pressure in accordance with the operation amount that has been input from the operation unit to the input piston to both the input and the pressure pistons such that the braking hydraulic pressure is generated. As a result, the structure of the system may be simplified, and the manufacturing costs may also be reduced. When the power source goes down, the electromagnetic hydraulic pressure supply unit becomes out of order. Then the mechanical hydraulic pressure supply unit is driven to apply the control hydraulic pressure in accordance with the operation amount that is transferred from the operation unit to the pressure piston via the input piston to the pressure piston such that the braking hydraulic pressure is generated. As the braking force may be appropriately applied when the power source goes down, the safety of the system, thus may be improved.

The vehicle braking system according the present invention may be further provided with one or more of the following features:

According to the invention, either the electromagnetic hydraulic pressure supply unit or the mechanical hydraulic pressure supply unit may regulate the control hydraulic pressure.

According to the invention, the mechanical hydraulic pressure supply unit may not regulate the control hydraulic pressure as long as the electromagnetic hydraulic pressure supply unit is regulating the control hydraulic pressure.

According to the invention the system may be provided with an operation force absorbing unit that absorbs an operation force input from the operation portion to the input piston.

According to the invention, the electromagnetic hydraulic pressure supply unit may be capable of supplying the control hydraulic pressure to one of a first pressure chamber and a second pressure chamber in a moving direction of the input piston. The operation force absorbing unit may include a communication passage formed in the input piston, through which a compression fluid is supplied and released between the first pressure chamber and the second pressure chamber.

According to the invention, the communication passage may include a portion that has a reduced diameter.

According to the invention, the electromagnetic hydraulic pressure supply unit may include a first hydraulic pressure supply line connected between the hydraulic pressure supply source and one of the first and the second pressure chambers, a first electromagnetic valve which is provided in the first hydraulic pressure supply line, and is closed where electric current is not supplied, a first hydraulic pressure exhaust line which is connected between one of the first and the second pressure chambers and a reservoir, and a second electromagnetic valve which is provided in the first hydraulic pressure exhaust line, and is opened where electric current is not supplied. The electromagnetic hydraulic pressure supply unit may regulate the hydraulic pressure supplied from the hydraulic pressure supply source to the control hydraulic pressure by adjusting opening degrees of the first and the second electromagnetic valves.

According to the invention, the mechanical hydraulic pressure supply unit may include a pressure regulating valve which is operated in response to a depression of the pressure piston performed by the input piston upon operation of the operation portion, a second hydraulic pressure supply line connected between the hydraulic pressure supply source and the pressure regulating valve, and a third hydraulic pressure supply line that connects the pressure regulating valve and the first pressure chamber. The opening degree of the pressure regulating valve may be adjusted by operating the operation portion to regulate the hydraulic pressure supplied from the hydraulic pressure supply source to the control hydraulic pressure.

According to the invention, the communication passage may be closed when the input piston is moved to be close to the pressure piston by operating the operation portion. The mechanical hydraulic pressure supply unit may apply the control hydraulic pressure regulated by the pressure regulating valve to generate the braking hydraulic pressure. The communication passage may be opened when the input piston is moved away from the pressure piston by operating the operation portion such that the braking hydraulic pressure is reduced.

According to the invention, the pressure regulating valve may include a poppet valve that closes and opens the second and the third hydraulic pressure supply lines, an urging member that urges the poppet valve into a closing direction, and a moveable member that is moved by the operation of the operation portion to open the poppet valve.

According to the invention, the pressure regulating valve may be accommodated within the pressure piston, and the third hydraulic pressure supply line is provided within the cylinder.

According to the invention, the communication passage may be closed when the input piston is moved to be in contact with the moveable member, and the moveable member may move the poppet valve so as to establish a communication between the second and the third hydraulic pressure supply lines.

According to the invention, the pressure regulating valve may be provided to a leading end of the cylinder. The third hydraulic pressure supply line may be provided outside of the cylinder. The communication passage may be closed when the input piston is moved to be in contact with the pressure piston. The hydraulic pressure caused by a movement of the pressure piston may allow the moveable member to move the poppet valve so as to establish a communication between the second and the third hydraulic pressure supply lines.

According to the invention, a switching valve may be provided in the third hydraulic pressure supply line. A second hydraulic pressure exhaust line may be connected between the pressure regulating valve and the reservoir. The switching valve may be opened and closed depending on a position of the poppet valve. The third hydraulic pressure supply line may be closed, and the second hydraulic pressure exhaust line may be opened during an operation of the electromagnetic hydraulic pressure supply unit. The third hydraulic pressure supply line may be opened, and the second hydraulic pressure exhaust line may be closed during an operation of the mechanical hydraulic pressure supply unit.

According to the invention, the mechanical hydraulic pressure supply unit may not be allowed to generate the braking hydraulic pressure when the control hydraulic pressure is applied to the pressure piston by the electromagnetic hydraulic pressure supply unit to generate the braking hydraulic pressure.

According to the invention, a first pressure receiving area of the input piston may be set to be smaller than a second pressure receiving area of the pressure piston.

According to the invention, a normal operation determination unit may be provided which allows the electromagnetic hydraulic pressure supply unit to apply a predetermined control hydraulic pressure to the input piston through which the pressure piston is moved to forcibly operate the mechanical hydraulic pressure supply unit, and determines with respect to a normal operation of the mechanical hydraulic pressure supply unit by detecting the braking hydraulic pressure.

According to the invention a normal operation determination unit may be provided which allows the electromagnetic hydraulic pressure supply unit to apply a predetermined control hydraulic pressure to the input piston so as to be moved to be close to the pressure piston such that the communication passage is closed, allows the input piston to move the pressure piston to forcibly operate the mechanical hydraulic pressure supply unit, and determines based on a generated braking hydraulic pressure whether or not the operation of the pressure regulating valve is normal.

According to the invention, the electromagnetic hydraulic pressure supply unit and the mechanical hydraulic pressure supply unit may apply the control hydraulic pressure to the pressure piston to allow the first and the second braking hydraulic pressures to be discharged from the first pressure chamber and a third pressure chamber of the pressure piston, respectively. The normal operation determination unit may close the second electromagnetic valve, and may open the first electromagnetic valve before starting a vehicle to apply a predetermined control hydraulic pressure to the input piston so as to make a determination with respect to the normal operation of the pressure regulating valve upon establishment of the conditions that: the second braking hydraulic pressure is equal to or higher than a predetermined second reference braking hydraulic pressure, and an operation amount of the operation portion is in a predetermined reference operation range.

According to the invention, the normal operation determination unit may determine that operation of the pressure regulating valve is normal if the first braking hydraulic pressure is equal to or higher than a predetermined first reference braking hydraulic pressure after an elapse of a predetermined time period from a time at which the second braking hydraulic pressure becomes equal to or higher than a second reference braking hydraulic pressure, and the operation amount to the operation portion is within a reference operation range.

According to the invention, before starting the vehicle, the normal operation determination unit may further close the discharge line of the second braking hydraulic pressure from the third pressure chamber.

According to the invention, the normal operation determination unit may close the second electromagnetic valve and may open the first electromagnetic valve when the vehicle is estimated to start such that the predetermined control hydraulic pressure is applied to the input piston.

According to the invention, the second braking hydraulic pressure may be obtained through an operation of the operation portion performed by an occupant of the vehicle.

According to the invention, the second braking hydraulic pressure may be obtained through application of the predetermined control hydraulic pressure to the input piston.

According to the invention, the electromagnetic hydraulic pressure supply unit and the mechanical hydraulic pressure supply unit may apply the control hydraulic pressure to the pressure piston to allow the first and the second braking hydraulic pressures to be discharged from the first pressure chamber and the third pressure chamber in the pressure piston. The normal operation determination unit may close the second electromagnetic valve and may open the first electromagnetic valve when the vehicle is estimated to start so as to make a determination with respect to the normal operation of the pressure regulating valve upon establishment of conditions that: the second braking hydraulic pressure obtained through application of the predetermined control hydraulic pressure to the input piston is equal to or higher than the predetermined second reference braking hydraulic pressure, and an operation amount to the operation portion is in the predetermined reference operation range.

According to the invention, the normal operation determination unit may make a determination with respect to a normal operation of the pressure regulating valve when the first braking hydraulic pressure is equal to or higher than a predetermined first reference braking hydraulic pressure after an elapse of a predetermined time period from a time at which the second braking hydraulic pressure becomes equal to or higher than a second reference braking hydraulic pressure, and the operation amount to the operation portion is within a reference operation range upon estimation of the vehicle start-up.

According to the invention, when the vehicle is estimated to start, the normal operation determination unit may close the discharge line of the second braking hydraulic pressure from the third pressure chamber so as to decompress the discharge line of the first braking hydraulic pressure from the first pressure chamber.

According to the invention, the normal operation determination unit may stop decompression in the discharge line of the first braking hydraulic pressure from the first pressure chamber, and may return the reduced first braking hydraulic pressure to the discharge line of the first braking hydraulic pressure after completion of the determination with respect to the normal operation of the pressure regulating valve.

According to the invention, a hydraulic pressure motor serving as the hydraulic pressure supply source may be stopped and the first and the second electromagnetic valves may be opened to set a static pressure mode when an abnormality occurs in a supply hydraulic pressure of the second hydraulic pressure supply line.

According to the invention, in the static pressure mode, the hydraulic pressure motor may be driven and an opening degree of the second electromagnetic valve may be adjusted upon an operation of the operation portion performed by the occupant of the vehicle.

DETAILED DESCRIPTION OF THE PREFERRED EMBODIMENTS

Figure 1:
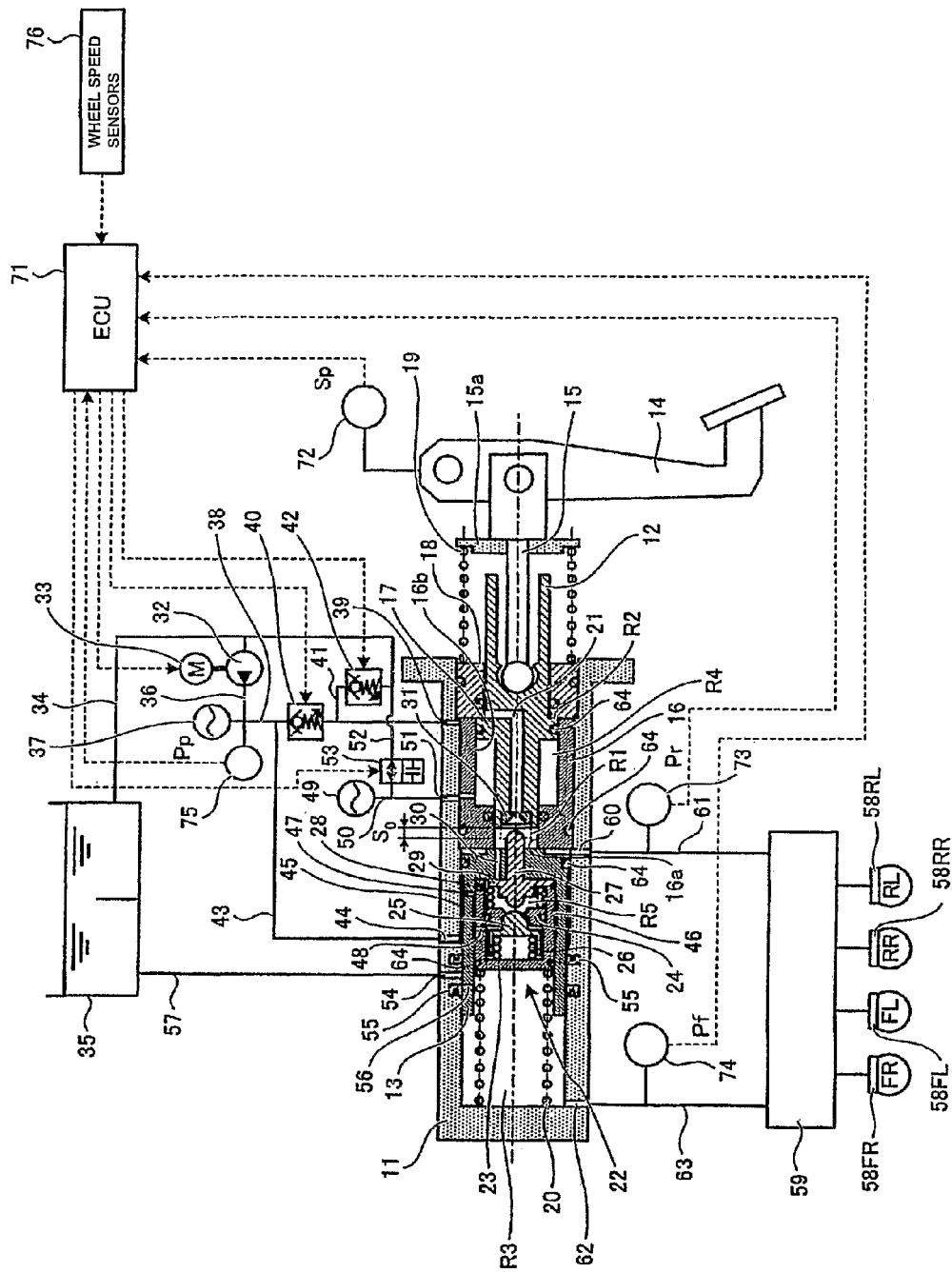
FIG. 1 is a view schematically showing a vehicle braking system according to a first embodiment of the invention.

Embodiments of the vehicle braking system according to the invention will be described in detail referring to the drawings. It is to be understood that those embodiments are not intended to limit the invention.

First Embodiment

FIG. 1 is a view schematically showing a vehicle braking system according to a first embodiment of the invention. FIG.

Figure 3:
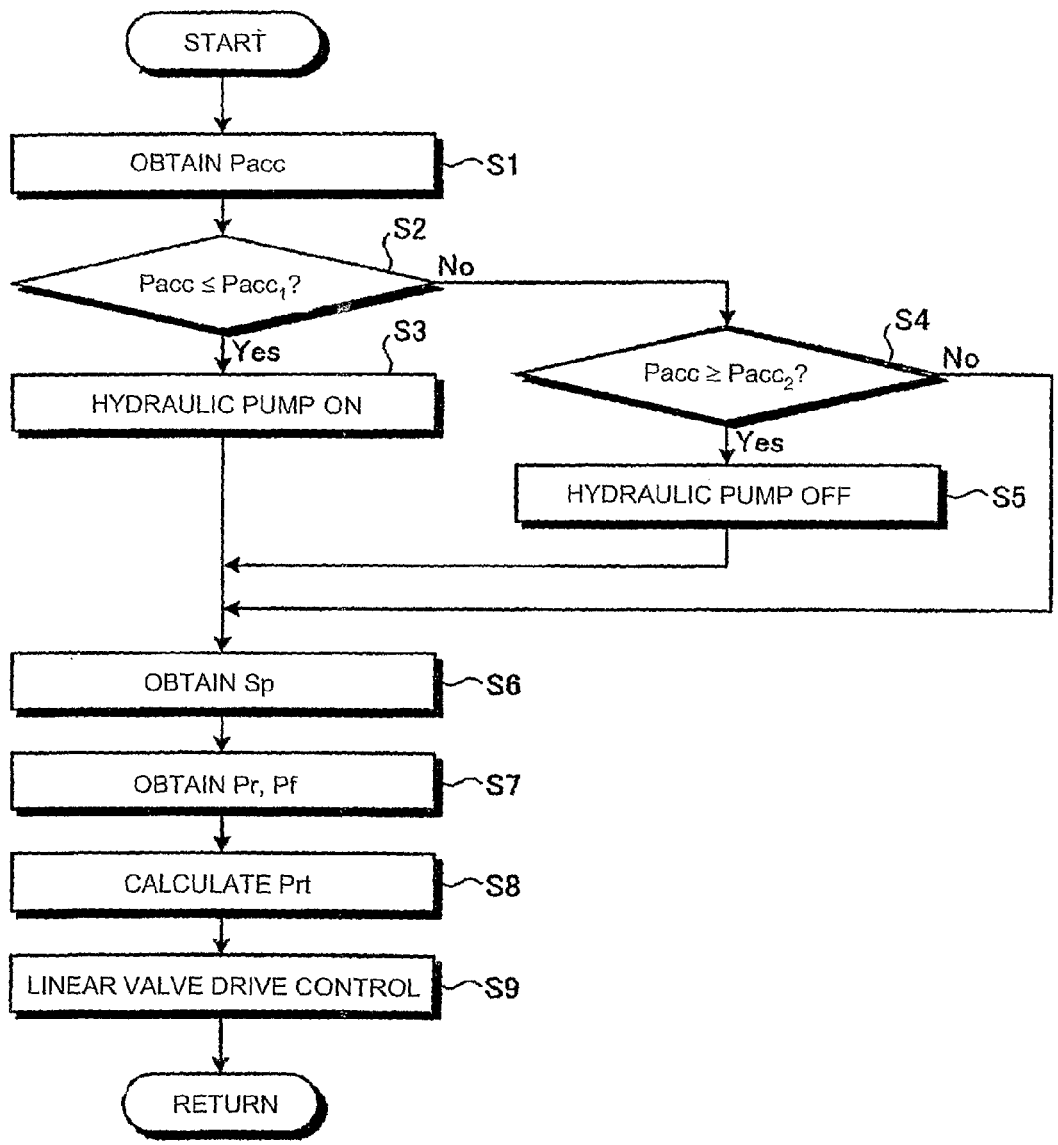
FIG. 3 is a flowchart showing the control routine for controlling the braking force in the vehicle braking system according to the first embodiment of the invention.
Figure 4:
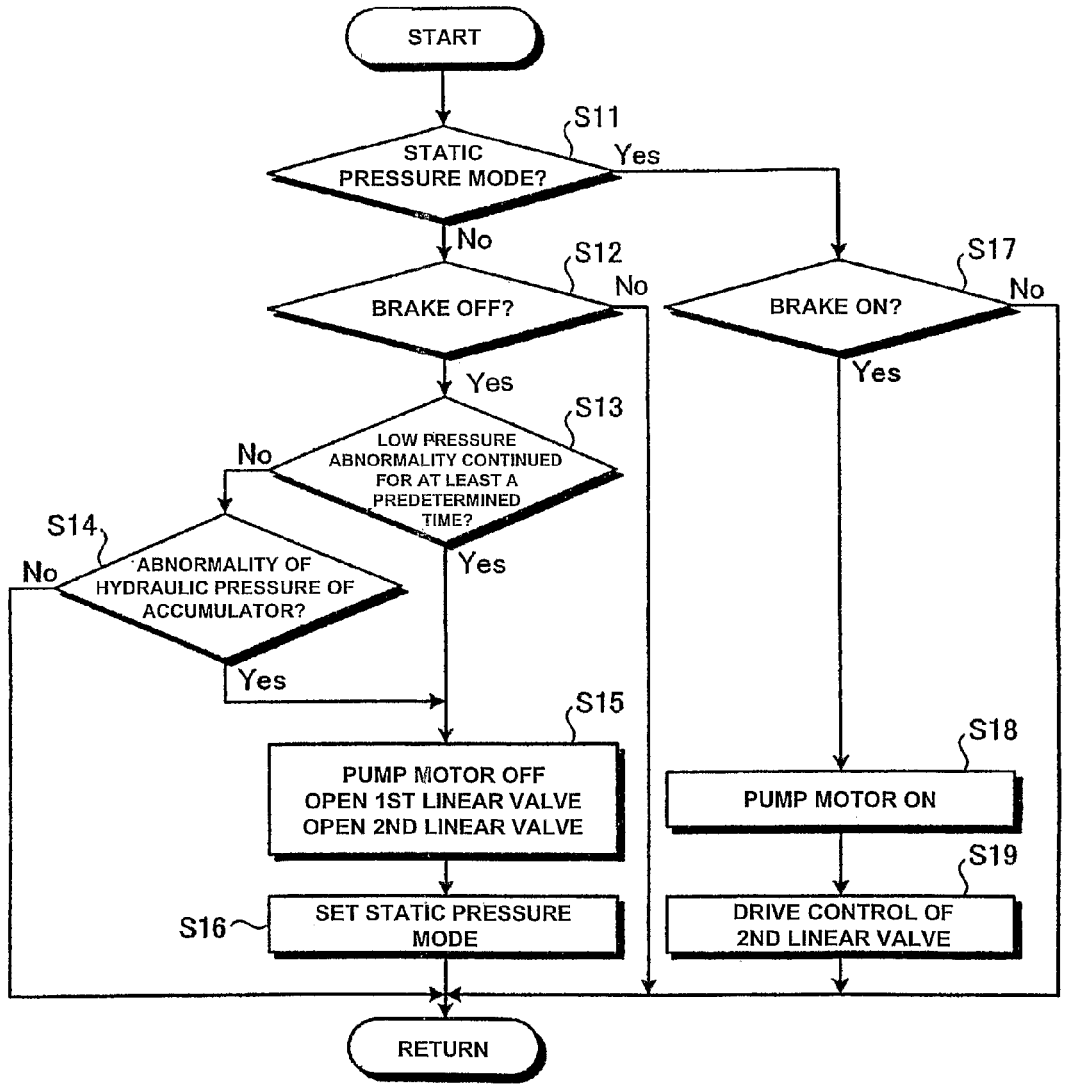
FIG. 4 is a flowchart showing the control routine for the static pressure mode under the braking force control in the vehicle braking system according to the first embodiment of the invention.

2 is a graph that shows a target output hydraulic pressure and a target reaction force with respect to the pedal stroke of the vehicle braking system according to the first embodiment. FIG. 3 is a flowchart showing a braking control routine executed in the vehicle braking system according to the first embodiment. FIG. 4 is a flowchart showing a static pressure mode control under the braking control executed in the vehicle braking system according to the first embodiment.

In a vehicle braking system of the first embodiment, a cylinder 11 has a cylindrical shape having an opened base end and a closed leading end, and supporting an input piston 12 and a pressure piston 13 coaxially provided so as to be moveable in the axial direction of the cylinder 11. The input piston 12 provided at the base end side of the cylinder 11 has its base end portion connected to an operation rod 15 of a brake pedal 14 serving as an operation member. The input piston 12 is moveable via the operation rod 15 in response to the operation of the brake pedal 14 by a driver. The input piston 12 is moveably supported by an inner surface of a small diameter portion 16a of a support member 16 having an outer periphery of its leading end fixed to an inner peripheral surface of the cylinder 11 through press fitting or threading. A disc-like flange portion 17 is moveably supported at an inner surface of a large diameter portion 16b of the support member 16. The operation stroke of the piston 12 is restricted by the flange portion 17 that abuts against the end surface of the small diameter portion 16a of the support member 16, and abuts against an end surface of a support member 18 fixed to the inner peripheral surface of the cylinder 11 through press fitting or threading. The input piston 12 is supported through urging by an urging spring 19 between the support member 18 and a flange portion 15a of the operation rod 15 at a position where the flange portion 17 abuts against the support member 18.

The pressure piston 13 provided at the leading end side of the cylinder 11 has a substantially U-like cross section, having its outer peripheral surface moveably supported at the inner peripheral surface of the cylinder 11. The pressure piston 13 has both front and rear ends in abutment against the cylinder 11 and the support member 16, respectively, to restrain the moving stroke. The pressure piston 13 is supported through urging by an urging spring 20 between the cylinder 11 and the pressure piston 13 at a position where the pressure piston 13 abuts against the support member 16. The input piston 12 and the pressure piston 13 are held apart at a predetermined interval (stroke) S0. When the driver depresses the brake pedal 14 to cause the input piston 12 to move forward by the predetermined stroke S0, the input piston 12 abuts against the pressure piston 13 to be depressed.

As the input piston 12 and the pressure piston 13 are coaxially provided so as to be moveable within the cylinder 11, a first pressure chamber R1 is defined by the input piston 12 and the pressure piston 13 in one movement direction of the input piston 12. Meanwhile, a second pressure chamber R2 is defined by the flange portion 17 of the input piston 12 and the support member 18 in the other movement direction of the input piston 12. A third pressure chamber R3 is defined by the cylinder 11 and the pressure piston 13. A fourth pressure chamber (reaction force chamber) R4 is defined by the support member 16 and the flange portion 17 of the piston 12. The first pressure chamber R1 is communicated with the second pressure chamber R2 through a communication passage 21 with an L-like shape formed in the input piston 12 serving as an operation force absorbing member.

A pressure regulating valve 22 is provided within the pressure piston 13. A hollow housing 23 is fit within the pressure piston 13 so as to be fixed thereto. The center portion of the housing 23 has a ring-like flange 24 formed therein. A poppet valve 25 is supported on one side within the housing 23 (left side shown in FIG. 1) so as to be moveable in the axial direction. The poppet valve 25 is supported through urging of a compression spring 26 as an urging member at a position where its leading end abuts against the flange portion 24. A load transmission member 27 as a moveable member that penetrates through the first pressure chamber R1 and a fifth pressure chamber R5 of the housing 23 is moveably supported in the pressure piston 13. The load transmission member 27 is urged by a compression spring 28 in the direction away from the poppet valve 25, and supported at a position where a flange portion 29 at the leading end side abuts against the pressure piston 13. A communication hole 30 is formed in the pressure piston 13 so as to communicate the first pressure chamber R1 with the fifth pressure chamber R5. The load transmission member 27 has a leading end projecting toward the first pressure chamber R1. The leading end of the input piston 12, that is, the open end of the communication passage 21 is positioned to face the leading end of the load transmission member 27. A valve seat 31 is formed at an opened end of the communication passage 21 so as to have an orifice (reduced diameter portion).

When the driver depresses the brake pedal 14 to move the input piston 12 forward, the valve seat 31 is brought into tight contact with the leading end of the load transmission member 27 to seal the communication passage 21. When the input piston 12 moves forward further, it depresses the load transmission member 27, through which the poppet valve 25 is depressed to be moved.

A hydraulic pump 32, driven by a motor 33 for supplying the hydraulic pressure, is connected to a reservoir tank 35 via a pipe 34, and also connected to an accumulator 37 via a pipe 36. The accumulator 37 is connected to the second pressure chamber R2 through a first hydraulic pressure supply pipe 38 via a first supply port 39 formed in the cylinder 11. A first linear valve 40 is provided in the first hydraulic pressure supply pipe (first hydraulic pressure supply line) 38, and a second linear valve 42 is provided in a first hydraulic pressure exhaust pipe (first hydraulic pressure exhaust line) 41 connected to the pipe 34 from the first hydraulic pressure supply pipe 38. The first and the second linear valves 40 and 42 are electromagnetic flow control valves. The first linear valve 40 is normally closed when electricity is not applied. The second linear valve 42 is normally opened when electricity is not applied.

The accumulator 37 is connected to a pressure regulating valve 22 within the pressure piston 13 through a second hydraulic pressure supply pipe (second hydraulic pressure supply line) 43 via a second supply port 44 formed in the cylinder 11. A ring-like shaped first gap 45 is partly provided between the pressure piston 13 and the inner peripheral surface of the cylinder 11. A ring-like shaped second gap 46 is partly provided between the pressure piston 13 and the housing 23. The second supply port 44 is communicated with the first gap 45. The first and the second gaps 45 and 46 are communicated with a first communication port 47 formed in the pressure piston 13. The second gap 46 is further communicated with a space at the side of the poppet valve 25 within the housing 23 via a second communication port 48. The fifth pressure chamber R5 and the communication hole 30 constitute a third hydraulic pressure supply line that connects the pressure regulating valve 22 and the first pressure chamber R1.

An accumulator 49 with a lower capacity than that of the accumulator 37 is connected to the reaction force chamber R4 through a reaction hydraulic pressure supply pipe 50 via a reaction supply port 51. A switching valve 53 is provided in a reaction hydraulic pressure exhaust pipe 52 connected to the pipe 34 from the reaction hydraulic pressure supply pipe 50.

A first discharge port 54 is formed in the cylinder 11, and has both sides provided with one-way seals 55. A second discharge port 56 is formed in the pressure piston 13. The third pressure chamber R3 is connected to the reservoir tank 35 through the second hydraulic pressure discharge pipe 57 via the first and the second discharge ports 54 and 56.

The front wheels FR, FL and the rear wheels RR, RL are provided with wheel cylinders 58FR, 58FL, 58RR, and 58RL for operating the braking device (not shown), which may be operated by an ABS (Antilock Brake System) 59. A first discharge port 60 communicated with the first pressure chamber R1 is connected to a first hydraulic pressure discharge pipe 61. The first hydraulic pressure discharge pipe 61 is connected to the ABS 59 so as to supply the hydraulic pressure to the wheel cylinders 58RR and 58RL of the rear wheels RR and RL, respectively. A second discharge port 62 formed in the third pressure chamber R3 is connected to a second hydraulic pressure discharge pipe 63. The second hydraulic pressure discharge pipe 63 is connected to the ABS 59 so as to supply the hydraulic pressure to the wheel cylinders 58FR and 58FL of the front wheels FR and FL, respectively.

O-rings 64 are attached to essential portions, for example, the cylinder 11, the input piston 12, the pressure piston 13, the pressure regulating valve 22 and the like for the purpose of preventing hydraulic pressure leakage.

An electronic control unit (ECU) 71 in the above-structured vehicle braking system according to the first embodiment sets a control hydraulic pressure (the control hydraulic pressure setting unit) in accordance with the operation amount (pedal stroke) input from the brake pedal 14 to the input piston 12. The ECU 71 applies the control hydraulic pressure to the input piston 12 and the pressure piston 13 to generate the braking hydraulic pressure (the electromagnetic hydraulic pressure supply unit) so as to drive the wheel cylinders 58FR, 58FL, 58RR, and 58RL by means of the ABS 59 and to apply the braking force to the front wheels FR and FL, and the rear wheels RR and RL, respectively. In this case, the control hydraulic pressure is supplied to the first and the second pressure chambers R1 and R2 of the input piston 12 for operating the input piston 12 and the pressure piston 13 such that the braking hydraulic pressure is generated form the first and the third pressure chambers R1 and R3.

In the embodiment, the operation force that has been input from the brake pedal 14 to the input piston 12 is absorbed such that the depression force of the input piston 12 cannot be transmitted to the pressure piston 13. The depression force is used as the reaction force so as not to be applied to the brake pedal 14. In this case, an operation force absorbing unit is realized by the communication passage 21 that communicates the first pressure chamber R1 with the second pressure chamber R2, and the predetermined distance S0 between the input piston 12 and the pressure piston 13.

If abnormality occurs in the electromagnetic hydraulic pressure supply unit, the mechanical hydraulic pressure supply unit is operated. That is, the operation force applied through the brake pedal 14 may cause the input piston 12 to directly depress the pressure piston 13 and drive the pressure regulating valve 22 such that an appropriate braking hydraulic pressure is generated.

The brake pedal 14 is provided with a stroke sensor 72 that detects a pedal stroke Sp of the brake pedal 14. The detected pedal stroke Sp is output to the ECU 71. The first and the second hydraulic pressure discharge pipes 61 and 63 are provided with first and second pressure sensors 73 and 74 that detect braking hydraulic pressures, respectively. The first pressure sensor 73 detects a braking hydraulic pressure Pr to be supplied to the wheel cylinders 58RR and 58RL of the rear wheels RR and RL from the first pressure chamber R1 through the first hydraulic pressure discharge pipe 61. The detected result will be output to the ECU 71. The second pressure sensor 74 detects a braking hydraulic pressure Pf to be supplied to the wheel cylinders 58FR and 58FL of the front wheels FR and FL from the third pressure chamber R3 through the second hydraulic pressure discharge pipe 63. The detected result will be output to the ECU 71.

A third pressure sensor 75 provided within the pipe 36 from the accumulator 37 detects the hydraulic pressure Pacc accumulated in the accumulator 37. The detected result will be output to the ECU 71. Wheel speed sensors 76 are attached to the front wheels FR and FL, and the rear wheels RR and RL, respectively, for detecting wheel speeds and outputting the detected wheel speeds to the ECU 71.

Figure 2:
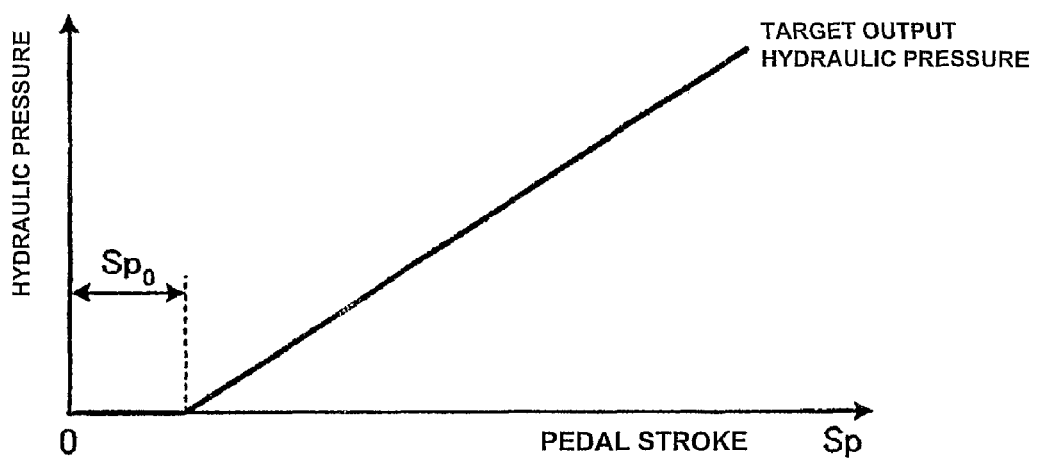
FIG. 2 is a graph representing a target output hydraulic pressure with respect to the pedal stroke and the target reaction force in the vehicle braking system according to the first embodiment of the invention.

The ECU 71 sets a target output hydraulic pressure Prt based on the pedal stroke Sp detected by the stroke sensor 72 as shown in FIG. 2 so as to adjust the opening degrees of the first and the second linear valves 40 and 42, respectively. The ECU 71 feedbacks the braking hydraulic pressure Pr detected by the first pressure sensor 73 for executing the control such that the target output hydraulic pressure Prt accords with the braking hydraulic pressure Pr. In this case, the ECU 71 stores a map having the relationship of the target output hydraulic pressure Prt with respect to the pedal stroke Sp, based on which the linear valves 40 and 42 are controlled. The control hydraulic pressure is set based on the pedal stroke Sp and the predetermined function map that contains the relationship between the Sp and Prt. The braking hydraulic pressures Pf and Pr are substantially the same (Pf≈Pr), and accordingly the relationship of Pr=f(Sp) is established (f refers to a function of the stroke with respect to the hydraulic pressure). The initial pedal stroke Sp0 may be a predetermined stroke S0 or may be set to the different value.

The braking force control executed by the ECU 71 of the vehicle braking system according to the first embodiment will be described referring to the flowchart shown in FIG. 3. Under the braking force control executed by the ECU 71, the accumulator pressure Pacc detected by the third pressure sensor 75 is obtained in step S1. Then in step S2, it is determined whether the accumulator pressure Pacc detected by the third pressure sensor 75 is equal to or lower than a predetermined first accumulator pressure Pacc1. If the detected accumulator pressure is equal to or lower than the first accumulator pressure Pacc1, the process proceeds to step S3 where the motor 33 for the hydraulic pump 32 is driven. Meanwhile, if the detected accumulator pressure is not equal to or lower than the first accumulator pressure Pacc1, the process proceeds to step S4 where it is determined whether the current accumulator pressure Pacc is equal to or higher than a predetermined second accumulator pressure Pacc2. If the current accumulator pressure Pacc is equal to or higher than the second accumulator pressure Pacc2, the process proceeds to step S5 where the motor 33 for the hydraulic pump 32 is stopped.

The pedal stroke Sp detected by the stroke sensor 72 is obtained in step S6. Then in step S7, the braking hydraulic pressure Pr detected by the first pressure sensor 73 and the braking hydraulic pressure Pf detected by the second pressure sensor 74 are obtained. In step S8, the target output hydraulic pressure Prt is calculated based on the pedal stroke Sp in accordance with the predetermined map. In step S9, the opening degrees of the first and the second linear valves 40 and 42 are regulated based on the calculated target output hydraulic pressure Prt. The braking hydraulic pressure Pr is feedback controlled so as to accord with the target output hydraulic pressure Prt.

Referring to FIG. 1, in the case where the battery as the power source is in the normal state, and the ECU 71 is capable of normally operating the first and the second linear valves 40 and 42 each serving as an electromagnetic hydraulic pressure supply member and adjusting each opening of those valves, when the driver depresses the brake pedal 14, the resultant operation force moves the input piston forward (leftward movement in FIG. 1). In this case, although the input piston 12 moves forward, the pressure piston 13 is not directly depressed because of the predetermined stroke S0 between the input piston 12 and the pressure piston 13. Accordingly, the work fluid within the first pressure chamber R1 flows into the second pressure chamber R2 via the communication passage 21. Accordingly, the input piston 12 is brought into a free state, and no reaction force acts on the brake pedal 14 from the first pressure chamber R1 via the input piston 12. However, the reaction hydraulic pressure acts on the reaction force chamber R4 from the accumulator 49 through the reaction hydraulic pressure pipe 50. The appropriate reaction force is applied to the brake pedal 14.

When the driver depresses the brake pedal 14, the input piston 12 moves forward. The stroke sensor 72 detects the pedal stroke Sp, and the ECU 71 sets the target output hydraulic pressure Prt based on the detected pedal stroke SP. The ECU 71 adjusts the opening degrees of the first and the second linear valves 40 and 42 based on the target output hydraulic pressure Prt such that a predetermined control hydraulic pressure is applied to the second pressure chamber R2. Then, the control hydraulic pressure is applied to the first pressure chamber R1 through the communication passage 21 such that the predetermined braking hydraulic pressure Pr is applied to the first hydraulic pressure discharge pipe 61 from the first pressure chamber R1, and the predetermined braking hydraulic pressure Pf is applied to the second hydraulic pressure discharge pipe 63 from the third pressure chamber R3. The braking hydraulic pressures Pr and Pf are applied to the wheel cylinders 58FR, 58FL, 58RR, and 58RL of the front wheels FR and FL and the rear wheels RR and RL, respectively, via the ABS 59.

When the input piston 12 is moved forward by the operation force applied to the brake pedal 14, and the predetermined control hydraulic pressure is applied to the second pressure chamber R2, the pressure within the first pressure chamber R1 becomes the same as that within the second pressure chamber R2. The input piston 12 is not brought into contact with the pressure piston 13 and the load transmission member 27 of the pressure regulating valve 22. The poppet valve 25 serves to maintain the state where the communication between the second hydraulic pressure supply pipe 43 and the fifth pressure chamber R5 of the pressure regulating valve 22 is interrupted. The input piston 12 and the pressure piston 13 move together while being held apart at a predetermined interval there between. When the communication between the first exhaust port 54 and the second exhaust port 56 is interrupted, the pressure piston 13 moves to pressurize the third pressure chamber R3. The balance of the hydraulic pressure may be taken between the first pressure chamber R1 and the third pressure R3 in accordance with the control hydraulic pressure applied to the first pressure chamber R1 such that the braking hydraulic pressures Pr and Pf discharged from the discharge ports 60 and 62 are substantially the same.

In the embodiment, a first pressure receiving area (area of the leading end) of the input piston 12 is set to be smaller than a second pressure receiving area (area of the leading end) of the pressure piston 13 such that a predetermined servo ratio is set. The urging force of the compression spring 26 is set to satisfy the following expression such that the poppet valve 25 is not opened under the maximum hydraulic pressure applied to the fifth pressure chamber R5 of the pressure regulating valve 22 from the first pressure chamber R1 upon application of the maximum control hydraulic pressure to the first pressure chamber R1 via the linear valves 40 and 42.

(seal area of poppet valve 25)×(maximum control hydraulic pressure of linear valves 40 and 42)< (urging force of the compression spring 26)

In the case where the battery goes down, and the ECU 71 is unable to operate the first and the second linear valves 40 and 42, and to adjust the opening degrees thereof, the first linear valve 40 is stopped in the closed state, and the second linear valve 42 is stopped in the opened state. When the driver depresses the brake pedal 14 in the aforementioned state, the operation force causes the input piston 12 to move forward. As the predetermined stroke S0 is set between the input piston 12 and the pressure piston 13, the pressure piston 13 is not directly depressed. The work fluid within the first pressure chamber R1 flows into the second pressure chamber R2 through the communication passage 21. The hydraulic pressure within the second pressure chamber R2 is released into a reservoir tank 35 from the first supply port 39 through the first hydraulic pressure exhaust pipe 41. The input piston 12, thus, is allowed to move until it contacts with the pressure piston 13 and the load transmission member 27 of the pressure regulating valve 22.

When the input piston 12 moves by the stroke S0 having the leading end in contact with the load transmission member 27 of the pressure regulating valve 22, the valve seat 31 tightly contacts with the leading end of the load transmission member 27 to seal the communication passage 21. The communication between the first pressure chamber R1 and the reservoir tank 35, thus, is interrupted. As the input piston 12 further moves forward to press the load transmission member 27, through which the poppet valve 25 is depressed to move, the second hydraulic pressure supply pipe 43 is communicated with the fifth pressure chamber R5. Then, the hydraulic pressure of the accumulator 37 is applied to the fifth pressure chamber R5 from the second hydraulic pressure supply pipe 43 through the second supply port 44, the first gap 45, the first communication port 47, the second gap 46, the second communication port 48, and the poppet valve 25. The hydraulic pressure is further applied to the first pressure chamber R1 through the communication hole 30.

When the input piston 12 and the pressure piston 13 are in contact with each other and move forward, the hydraulic pressure of the accumulator 37 is applied to the first pressure chamber R1. Then, the predetermined braking hydraulic pressure Pr is applied to the first hydraulic pressure discharge pipe 61 from the first pressure chamber R1. As the pressure piston 13 moves forward, the third pressure chamber R3 is pressurized to apply the predetermined braking hydraulic pressure Pf to the second hydraulic pressure discharge pipe 63 from the third pressure chamber R3. The braking hydraulic pressures Pr and Pf are applied to the wheel cylinders 58FR, 58FL, 58RR, and 58RL via the ABS 59 such that the braking force in accordance with the operation force applied to the brake pedal 14 by the driver is generated with respect to the front wheels FR and FL and the rear wheels RR and RL, respectively.

When the driver stops (maintains) depressing the brake pedal 14, the valve seat 31 of the input piston 12 keeps contact with the load transmission member 27. Then, the depression to the poppet valve 25 by the load transmission member 27 is released while closing the communication passage 21, and communication between the second hydraulic pressure supply pipe 43 and the fifth pressure chamber R5 is interrupted. The first and the third pressure chambers R1 and R3 are sealed to maintain the braking hydraulic pressures Pr and Pf to be discharged to the ABS 59.

When the driver releases the brake pedal 14, the valve seat 31 of the input piston 12 moves away from the load transmission member 27 to release the communication passage 21. The hydraulic pressure within the first pressure chamber R1 flows into the second pressure chamber R2 through the communication passage 21, and is discharged into the reservoir tank 35 from the first supply port 39 through the first hydraulic pressure exhaust pipe 41. Meanwhile, when the brake pedal 14 is released, the input piston 12 retracts, and the pressure piston 13 also retracts under the urging force of the urging spring 20. The hydraulic pressure within the third pressure chamber R3 is discharged into the reservoir tank 35 from the second discharge port 54 through the second hydraulic pressure discharge pipe 57. Each hydraulic pressure within the first and the third pressure chambers R1 and R3 is decreased so as to reduce the braking hydraulic pressures Pr and Pf to be discharged to the ABS 59.

In the case where the battery is in the normal state, and the first and the second linear valves 40 and 42 are operated and the opening degrees thereof are adjusted so as to allow the supply of the appropriate control hydraulic pressure, high hydraulic pressure is constantly supplied to the pressure regulating valve 22 from the accumulator 37 through the second hydraulic pressure supply pipe 43. If a low pressure abnormality occurs at the side of the pressure regulating valve 22, the pressure accumulated in the accumulator 37 is reduced so as to shift to a static pressure mode.

Referring to FIG. 4, it is determined in step S11 whether the current state is in the static pressure mode. If it is determined that it is not in the static pressure mode, the process proceeds to step S12 where it is determined whether the brake pedal 14 is in OFF state. If it is determined that the brake pedal 14 is in OFF state, the process proceeds to step S13 where it is determined whether the low pressure abnormality state has been continued for a predetermined time or longer at the side of the pressure regulating valve 22. The determination is made based on the detection results of the pressure sensors 73 and 74, for example. If it is determined that the low pressure abnormality state has been continued for the predetermined time or longer in step S13, the process proceeds to step S15. Meanwhile, if it is determined that the low pressure abnormality state has not been continued for the predetermined time or longer in step S13, the process proceeds to step S14 where it is determined whether the hydraulic pressure of the accumulator 37 detected by the third pressure sensor 75 has an abnormality. If it is determined that the hydraulic pressure of the accumulator 37 detected by the third pressure sensor 75 has the abnormality, the process proceeds to step S15.

In step S15, the motor 33 for the hydraulic pump 32 is stopped so as to open the first and the second linear valves 40 and 42, and to allow the hydraulic pressure of the accumulator 37 to be communicated with the reservoir tank 35. Then in step S16, the static pressure mode is set. After setting of the static pressure mode, the process proceeds to step S17 based on the determination made in step S11. In step S17, it is determined whether the brake pedal 14 has been operated. If it is determined that the brake pedal 14 has been operated, the process proceeds to step S18 where the motor 33 for the hydraulic pump 32 is driven to adjust the opening degree of the second linear valve 42 such that the control hydraulic pressure is adjusted. Meanwhile, if it is determined that the brake pedal 14 has not been operated in step S17, the static pressure mode is continued.

In the vehicle braking system according to the first embodiment, the input piston 12 and the pressure piston 13 are moveably supported within the cylinder 11, and the pressure piston 13 may be depressed by the input piston 12. The pressure chambers R1 and R2 to the front and rear of the input piston 12 are communicated through the communication passage 21, and the control hydraulic pressure in accordance with the operation amount to the brake pedal 14 may be supplied to the second pressure chamber R2 through the first and the second linear valves 40 and 42. The control hydraulic pressure in accordance with the operation amount that has been transmitted from the brake pedal 14 to the pressure piston 13 via the input piston 12 is regulated by the pressure regulating valve 22 so as to be supplied to the second pressure chamber R2. The braking hydraulic pressures Pr and Pf may be output from the pressure chambers R1 and R3, respectively.

In the case where the battery is in the normal state, when the driver depresses the brake pedal 14, the ECU 71 sets the target output hydraulic pressure Prt in accordance with the pedal stroke Sp. Based on the target output hydraulic pressure Prt, the control hydraulic pressure is applied to the first pressure chamber R1 such that a predetermined braking hydraulic pressure Pr is output from the first pressure chamber R1 to the first hydraulic pressure discharge pipe 61, and a predetermined braking hydraulic pressure Pf is output from the third pressure chamber R3 to the second hydraulic pressure discharge pipe 63. The afore-mentioned braking hydraulic pressures Pr and Pf are applied to the wheel cylinders 58FR, 58FL, 58RR, and 58RL, respectively, via the ABS 59 so as to generate the appropriate braking force in accordance with the operation force to the brake pedal 14 performed by the driver with respect to the front wheels FR and FL, and the rear wheel RR and RL, respectively.

In the case where the battery goes down, upon depression of the brake pedal 14 by the driver, the input piston 12 is moved forward to be in contact with the load transmission member 27 of the pressure regulating valve 22 such that the communication passage 21 is closed. When the load transmission member 27 moves while depressing the poppet valve 25, the second hydraulic pressure supply pipe 43 is communicated with the fifth pressure chamber R5. The hydraulic pressure from the accumulator 37 is regulated by the pressure regulating valve 22 so as to be applied to the first pressure chamber R1. The braking hydraulic pressure Pr is output from the first pressure chamber R1, and the braking hydraulic pressure Pf is output from the third pressure chamber R3. The braking hydraulic pressures Pr, Pf are applied to the wheel cylinders 58FR, 58FL, 58RR, and 58RL, respectively, via the ABS 59 such that the appropriate braking force in accordance with the operation force to the brake pedal 14 by the driver may be generated with respect to the front wheels FR and FL, and the rear wheels RR and RL.

When the driver stops depressing the brake pedal 14, the depression of the poppet valve 25 by the load transmission member 27 is released while the communication passage 21 being closed. Then, the communication between the second hydraulic pressure supply pipe 43 and the fifth pressure chamber R5 is interrupted to seal the first and the third pressure chambers R1 and R3 such that the braking hydraulic pressure Pr and Pf are maintained. When the driver releases the brake pedal 14, the input piston 12 moves away from the load transmission member 27 to open the communication passage 21. Then, the hydraulic pressure within the first pressure chamber R1 is discharged into the reservoir tank 35 through the communication passage 21, and the pressure piston 13 retracts to discharge the hydraulic pressure within the third pressure chamber R3 into the reservoir tank 35. Each hydraulic pressure within the first and the third pressure chambers R1 and R3 is decreased such that the braking hydraulic pressures Pr and Pf may be reduced.

The system according to the invention makes sure to generate the braking hydraulic pressure in accordance with the operation amount to the brake pedal 14 performed by the driver whether the power source is in the normal state or in the abnormal state. As the hydraulic pressure path may be simplified, the structure may further be simplified to reduce the manufacturing costs. The system is capable of applying the braking force appropriately even in the case where the power source goes down, resulting in improved safety.

In the vehicle braking system according to the first embodiment, the operation force absorbing unit is formed by the communication passage 21 that communicates the first and the second pressure chambers R1 and R2, and the input piston 12 and the pressure piston 13 are held apart at a predetermined interval S0. The reaction force fluctuation against the brake pedal 14 may be suppressed with a simple structure. The valve seat 31 is provided within the communication passage 21 to form the diameter reduced portion such that the driving power is generated as the input piston 12 moves forward.

The vehicle braking system according to the first embodiment is provided with the pressure regulating valve 22 disposed within the pressure piston 13, which includes the housing 23, the poppet valve 25 moveably supported in the housing 23 to open and close the second hydraulic pressure supply pipe 43 and the fifth pressure chamber R5 (third hydraulic pressure supply line), the compression spring 26 that urges the poppet valve 25 toward the closing direction, and the load transmission member 27 that moves toward the input piston 12 to open the poppet valve 25. When the input piston 12 moves to be in contact with the load transmission member 27, the communication passage 21 is closed. When the load transmission member 27 moves the poppet valve 25 to communicate the second hydraulic pressure supply pipe 43 and the fifth pressure chamber R5, the hydraulic pressure from the accumulator 37 is regulated with the pressure regulating valve 22 to be applied to the first pressure chamber R1. The braking hydraulic pressures Pr and Pf, thus, may be discharged. As the pressure regulating valve 22 may be efficiently mounted, the entire length of the cylinder 11 may be reduced, and the path for supplying the control hydraulic pressure may be switched between the normal state and the abnormal state of the battery with a simple structure. This makes it possible to further reduce the manufacturing costs.

The urging force of the compression spring 26 is set such that the poppet valve 25 is not opened under the maximum hydraulic pressure applied to the fifth pressure chamber R5 of the pressure regulating valve 22 from the first pressure chamber R1 upon application of the maximum control hydraulic pressure to the first pressure chamber R1 through the linear valves 40 and 42. The system according to the invention makes it possible to inhibit operation of the mechanical hydraulic pressure supply unit in the normal state of the power source so as to prevent generation of unnecessary control hydraulic pressure, resulting in improved safety.

The first pressure receiving area of the input piston 12 is set to be smaller than the second pressure receiving area of the pressure piston 13 such that a desired servo ratio may be obtained.

Second Embodiment

Figure 5:
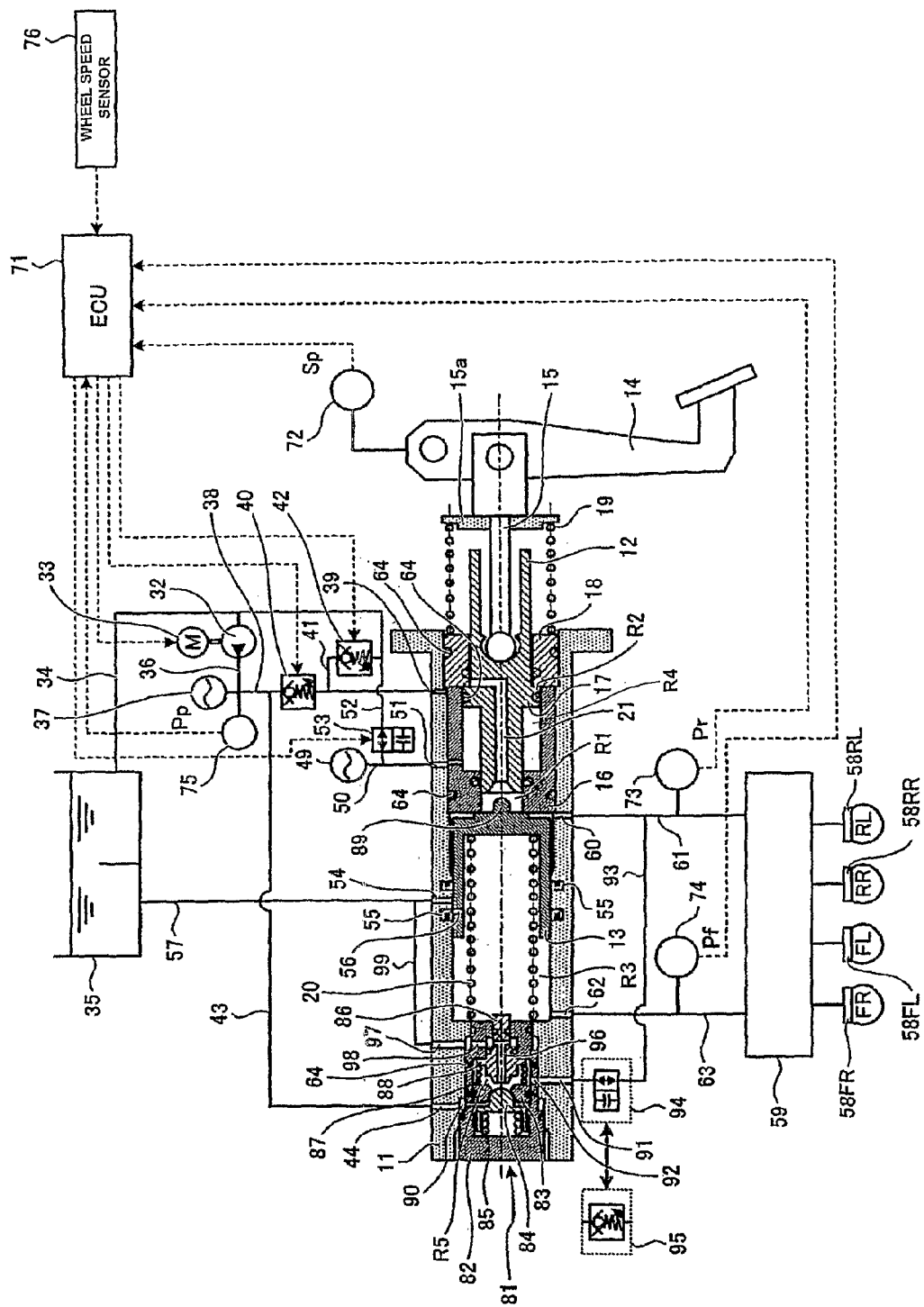
FIG. 5 is a view schematically showing a vehicle braking system according to a second embodiment of the invention.

FIG. 5 is a view schematically showing a structure of a vehicle braking system according to a second embodiment of the invention. The member having the same function as that described in the first embodiment will be designated with the same reference numeral, and explanation of such member, thus, will be omitted.

Referring to FIG. 5, in the vehicle braking system according to the second embodiment, the input piston 12 and the pressure piston 13 are supported within the cylinder 11 so as to be moved along the axial direction. The input piston 12 has the base end connected to the operation rod 15 of the brake pedal 14. The stroke of the input piston 12 is restricted through abutment of the flange portion 17 against the support members 16 and 18, respectively. The input piston 12 is supported through urging of the urging spring 19 at a position where the flange portion 17 abuts against the support member 18. The stroke of the pressure piston 13 is restricted through abutment of the cylinder 11 against the support member 16. The pressure piston 13 is supported through urging of the urging spring 20 at a position in abutment against the support member 16. The input piston 12 and the pressure piston 13 are kept apart from each other at a predetermined interval (stroke) S0. When the input piston 12 is moved forward at the predetermined stroke S0 by the driver's operation of the brake pedal 14, it abuts against the pressure piston 13 so as to be depressed.

As the input piston 12 and the pressure piston 13 are moveably provided within the cylinder 11, the first and the second pressure chambers R1 and R2 are formed to the front and to the rear of the input piston 12, and the third pressure chamber R3 is formed between the cylinder 11 and the pressure piston 13. The fourth pressure chamber (reaction force chamber) R4 is formed between the support member 16 and the flange portion 17 of the input piston 12. The first and the second pressure chambers R1 and R2 are communicated with each other through the communication passage 21 formed within the input piston 12.

A pressure regulating valve 81 is held in the leading end of the cylinder 11. That is, a hollow housing 82 is fit in the leading end of the cylinder 11 so as to be fixed thereto. A ring-shaped flange 83 is formed in the center portion within the housing 82. A poppet valve 84 is moveably supported at one side (left side in FIG. 5) within the housing 82 along its axial direction through urging of a compression spring 85 as an urging member at a position where the leading end abuts against the flange 83. A pressure transmission member 86 as a moveable member that passes through the third pressure chamber R3 and the fifth pressure chamber R5 of the housing 82 are moveably supported at the other side (right side in FIG. 5) within the housing along the axial direction. The pressure transmission member 86 is urged by a compression spring 87 in the direction away from the poppet valve 84, and supported at a position where a flange portion 88 at the leading end side abuts against the housing 82. The pressure transmission member 86 has the leading end projecting toward the third pressure chamber R3. The pressure piston 13 is provided with a projecting portion 89 that projects toward the first pressure chamber R1. The leading end of the input piston 12, that is, the open end of the communication passage 21 is positioned opposite to the projecting portion 89 of the pressure piston 13.

When the input piston 12 is moved forward through operation of the brake pedal 14 by the driver, the open end of the communication passage 21 is brought into tight contact with the projecting portion 89 of the pressure piston 13 so as to close the communication passage 21. As the pressure piston 13 moves forward together with the input piston 12, the pressure within the third pressure chamber R3 is increased to move the pressure transmission member 86 under pressure, through which the poppet valve 84 is depressed to be moved.

The hydraulic pump 32 driven by the motor 33 for supplying the hydraulic pressure is connected to the reservoir tank 35 via the pipe 34, and connected to the accumulator 37 via the pipe 36. The accumulator 37 is connected to the second pressure chamber R2 through the first hydraulic pressure supply pipe 38 via the first supply port 39. The first linear valve 40 is provided within the first hydraulic pressure supply pipe 38, and the second linear valve 42 is provided within the first hydraulic pressure exhaust pipe 41 connected to the pipe 34 from the first hydraulic pressure supply pipe 38.

The accumulator 37 is connected to the pressure regulating valve 81 through the second hydraulic pressure supply pipe 43 via the second supply port 44 of the cylinder 11. In other words, the second supply port 44 is communicated with a space in the housing 82 at the side of the poppet valve 25 via a communication port 90 formed in the housing 82. The cylinder 11 and the housing 82 have third and fourth supply ports 91 and 92 communicated with the fifth pressure chamber R5. The third and fourth supply ports 91 and 92 are connected to the first hydraulic pressure discharge pipe 61 via the third hydraulic pressure supply pipe (third hydraulic pressure supply line) 93. The third hydraulic pressure supply pipe 93 is provided with a switching valve 94 or a relief valve 95. A communication hole 96 is formed through the pressure transmission member 86 having one end communicated with the fifth pressure chamber R5, and the other end connected to the second hydraulic pressure exhaust pipe 57 via third and fourth exhaust ports 97 and 98, and a third hydraulic pressure exhaust pipe 99.

The accumulator 49 is connected to the reaction force chamber R4 through the reaction hydraulic pressure supply pipe 50 via the reaction supply port 51. Switching valve 53 is provided in the reaction hydraulic pressure exhaust pipe 52 connected to the pipe 34 from the reaction hydraulic pressure supply pipe 50.

The first exhaust port 54 is formed in the cylinder 11, and a one-way seals 55 are attached to both sides thereof. The second exhaust port 56 is formed in the pressure piston 13. The third pressure chamber R3 is connected to the reservoir tank 35 through the second hydraulic pressure exhaust pipe 57 via the first and the second exhaust ports 54 and 56.

The front wheels FR, FL and the rear wheels RR, RL are provided with the wheel cylinders 58FR, 58FL, 58RR, and 58RL, respectively, so as to be operated by the ABS 59. The first hydraulic pressure discharge pipe 61 is connected to the first discharge port 60 with which the first pressure chamber R1 is communicated. The first hydraulic pressure discharge pipe 61 is connected to the ABS 59 so as to allow the hydraulic pressure to be supplied to the wheel cylinders 58RR and 58RL of the rear wheels RR and RL. The second hydraulic pressure discharge pipe 63 is connected to the second discharge port 62 formed in the third pressure chamber R3. The second hydraulic pressure discharge pipe 63 is connected to the ABS 59 so as to supply the hydraulic pressure to the wheel cylinders 58FR, 58FL of the front wheels FR, FL, respectively.

In the thus structured vehicle braking system, the brake pedal 14 is provided with a stroke sensor 72 for detecting a pedal stroke Sp. The detected pedal stroke Sp is output to the ECU 71. The first and the second hydraulic pressure discharge pipes 61 and 63 are provided with first and second pressure sensors 73 and 74, respectively, for detecting braking hydraulic pressures. The detected braking hydraulic pressures Pr and Pf are output to the ECU 71. The pipe 36 from the accumulator 37 is provided with a third pressure sensor 75. The hydraulic pressure Pacc accumulated in the accumulator 37 is output to the ECU 71. The front wheels FR, FL and the rear wheels RR, RL are provided with vehicle wheel speed sensors 76, respectively. The detected vehicle wheel speeds are output to the ECU 71.

When the battery as the power source is in the normal state, and the ECU 71 is capable of operating the first and the second linear valves 40 and 42, and adjusting the opening degrees thereof normally, the input piston 12 is moved forward (leftward as shown in FIG. 5) in response to a depression of the brake pedal 14 performed by the driver. In the aforementioned state, the input piston 12 is moved forward, but the pressure piston 13 is not directly depressed as they are kept apart from each other at a predetermined stroke S0. Then, the work fluid within the first pressure chamber R1 flows into the second pressure chamber R2 through the communication passage 21. The input piston 12 is brought into a free state. In this case, the reaction force is not applied to the brake pedal 14 from the first pressure chamber R1 via the input piston 12, but the reaction hydraulic pressure is applied to the reaction force chamber R4 through the reaction force hydraulic pressure pipe 50 from the accumulator 49. The appropriate reaction force, thus, is applied to the brake pedal 14.

As the input piston 12 is moved forward in response to the depression of the brake pedal 14 performed by the driver, the stroke sensor 72 detects the pedal stroke Sp. The ECU 71 then sets the target output hydraulic pressure Prt based on the detected pedal stroke Sp. The ECU 71 adjusts the opening degrees of the first and the second linear valves 40 and 42 based on the target output hydraulic pressure Prt such that a predetermined control hydraulic pressure is applied to the second pressure chamber R2. The control hydraulic pressure is then applied to the first pressure chamber R1 through the communication passage 21. The predetermined braking hydraulic pressure Pr is applied to the first hydraulic pressure discharge pipe 61 from the first hydraulic chamber R1, and the predetermined braking hydraulic pressure Pf is applied to the second hydraulic pressure discharge pipe 63 from the third pressure chamber R3. The braking hydraulic pressures Pr and Pf are applied to the wheel cylinders 58FR, 58FL, 58RR, and 58RL, respectively, via the ABS 59 so as to generate the braking force with respect to the front wheels FR, FL and the rear wheels RR, RL in accordance with the operation force applied to the brake pedal by the driver.

The force applied to the brake pedal 14 moves the input piston 12 forward. When the predetermined control hydraulic pressure is applied to the second pressure chamber R2, the pressure within the first pressure chamber R1 becomes the same as that within the second pressure chamber R2. Accordingly, the input piston 12 is not in contact with the pressure piston 13 such that the communication between the second hydraulic pressure supply pipe 43 and the fifth pressure chamber R5 of the pressure regulating valve 81 is kept to be interrupted. If the input piston 12 and the pressure piston 13 move together while being kept apart at the predetermined interval to close the first and the second exhaust ports 54 and 56, the third pressure chamber R3 is pressurized owing to the movement of the pressure piston 13. The hydraulic pressure of the first pressure chamber R1 is balanced with that of the third pressure chamber R3 in accordance with the control hydraulic pressure applied to the first pressure chamber R1. This makes it possible to equalize the braking hydraulic pressures Pr, Pf discharged from the respective discharge ports 60, 62.

As described above, when the ECU 71 operates the first and the second linear valves 40 and 42, and adjusts opening degrees thereof to apply the control hydraulic pressure, the switching valve 94 is closed.

Meanwhile, when the ECU 71 becomes unable to operate the first and the second linear valves 40 and 42, and to adjust opening degrees thereof in the case where the battery goes down, the first linear valve 40 is stopped in the closed state, and the second linear valve 42 is stopped in the opened state. When the driver depresses the brake pedal 14 in the aforementioned state, the force applied to the brake pedal 14 moves the input piston 12 forward. As the input piston 12 and the pressure piston 13 are kept apart at the predetermined stroke S0, the pressure piston 13 is not directly depressed. Accordingly, the work fluid within the first pressure chamber R1 flows into the second pressure chamber R2 through the communication passage 21 as described above. The hydraulic pressure within the second pressure chamber R2 is discharged into the reservoir tank 35 from the first supply port 39 through the first hydraulic pressure exhaust pipe 41. The input piston 12 is moved forward until it is brought into contact with the pressure piston 13.

When the input piston 12 moves forward by the stroke S0 to have its leading end in contact with the projecting portion 89 of the pressure piston 13, the open end of the communication passage 21 is in tight contact with the projecting portion 89 to close the communication passage 21. The communication between the first pressure chamber R1 and the reservoir tank 35 is interrupted. When the input piston 12 is moved forward together with the pressure piston 13, the pressure within the third pressure chamber R3 is increased such that the pressure transmission member 86 is moved under pressure. The poppet valve 84 is moved under pressure via the pressure transmission member 86 to establish the communication between the second hydraulic pressure supply pipe 43 and the fifth pressure chamber R5. The hydraulic pressure of the accumulator 37 is then applied to the fifth pressure chamber R5 from the second hydraulic pressure supply pipe 43 via the second supply port 44, the communication port 90, and the poppet valve 84. The hydraulic pressure is further applied to the first pressure chamber R1 via the switching valve 94, the third hydraulic pressure exhaust pipe 93, and the first hydraulic pressure discharge pipe 61.

When the input piston 12 and the pressure piston 13 are moved forward while being in contact with each other, the hydraulic pressure of the accumulator 37 is applied to the first hydraulic pressure discharge pipe 61 through the third hydraulic pressure exhaust pipe 93. Then, the predetermined braking hydraulic pressure Pr is applied to the first hydraulic pressure discharge pipe 61. The forward movement of the pressure piston 13 pressurizes the third pressure chamber R3 such that the predetermined braking hydraulic pressure Pf is applied to the second hydraulic pressure discharge pipe 63 from the third pressure chamber R3. The braking hydraulic pressures Pr, Pf are applied to the wheel cylinders 58FR, 58FL, 58RR, and 58RL, respectively, such that the braking force in accordance with the operation force applied to the brake pedal 14 by the driver may be generated with respect to the front and the rear wheels FR, FL, RR, and RL.

When the driver releases the brake pedal 14, the input piston 12 moves away from the projecting portion 89 of the pressure piston 13 to open the communication passage 21. Then, the hydraulic pressure within the first pressure chamber R1 flows into the second pressure chamber R2 through the communication passage 21 so as to be discharged into the reservoir tank 35 from the first supply port 39 through the first hydraulic pressure exhaust pipe 41. When the brake pedal 14 is released, the input piston 12 retracts and the pressure piston 13 retracts under the urging force of the urging spring 20. The hydraulic pressure within the third pressure chamber R3 is released into the reservoir 35 from the second exhaust port 54 through the second hydraulic pressure exhaust pipe 57. Each hydraulic pressure of the first and the third pressure chambers R1 and R3 is decreased to reduce the braking hydraulic pressures Pr and Pf discharged to the ABS 59.

In the vehicle braking system according to the second embodiment, the input piston 12 and the pressure piston 13 are moveably supported within the cylinder 11, and the input piston 12 is allowed to depress the pressure piston 13. The input piston 12 is connected to the brake pedal 14 such that the first and the second pressure chambers R1 and R2 to the front and the rear of the input piston 12 are communicated with each other through the communication passage 21. The control hydraulic pressure in accordance with the operation amount to the brake pedal 14 may be supplied to the second pressure chamber R2 via the first and the second linear valves 40 and 42. The control hydraulic pressure in accordance with the operation amount of the brake pedal 14 that has been transmitted to the pressure piston 13 via the input piston 12 is regulated by the pressure regulating valve 81 so as to be supplied to the second pressure chamber R2. This makes it possible to output the braking hydraulic pressure from the pressure chambers R1 and R3, respectively.

When the driver depresses the brake pedal 14 in the state where the battery is normally operated, the ECU 71 sets the target output hydraulic pressure Prt in accordance with the pedal stroke Sp. Based on the target output hydraulic pressure Prt, the control hydraulic pressure is applied to the first pressure chamber R1 so as to output the predetermined braking hydraulic pressure Pr to the first hydraulic pressure discharge pipe 61 from the first pressure chamber R1, and to output the predetermined braking hydraulic pressure Pf to the second hydraulic pressure discharge pipe 63 from the third pressure chamber R3, respectively. The braking hydraulic pressures Pr, Pf are applied to the respective wheel cylinders 58FR, 58FL, 58RR, and 58RL such that the appropriate braking force in accordance with the operation force applied to the brake pedal 14 by the driver may be generated with respect to the front and the rear wheels FR, FL, RR, and RL.

When the driver depresses the brake pedal 14 in the state where the battery goes down, the input piston 12 is moved forward to be in contact with the projecting portion 89 of the pressure piston 13. The communication passage 21 is then closed, and the pressure within the third pressure chamber R3 is increased to allow the pressure transmission member 86 to move the poppet valve 84 under pressure through the movement of the pressure piston 13. The communication between the second hydraulic pressure supply pipe 43 and the fifth pressure chamber R5 is then established. The hydraulic pressure of the accumulator 37 is regulated by the pressure regulating valve 81 so as to be applied to the first pressure chamber R1. The braking hydraulic pressure Pr is output from the first pressure chamber R1, and the braking hydraulic pressure Pf is output from the third pressure chamber R3, respectively. The braking hydraulic pressures Pr, Pf are applied to the respective wheel cylinders 58FR, 58FL, 58RR, and 58RL such that the appropriate braking force in accordance with the operation force applied to the brake pedal 14 by the driver may be generated with respect to the front and the rear wheels FR, FL, RR, and RL.

When the driver releases the brake pedal 14, the input piston 12 moves away from the projecting portion 89 of the pressure piston 13 such that the communication passage 21 is opened. Then, the hydraulic pressure within the first pressure chamber R1 is discharged into the reservoir tank 35 through the communication passage 21, and the pressure piston 13 retracts to discharge the hydraulic pressure within the third pressure chamber R3 into the reservoir tank 35. The thus reduced hydraulic pressures within the first and the third pressure chambers R1 and R3 serve to decrease the braking hydraulic pressures Pr and Pf.

The braking hydraulic pressure in accordance with the operation amount to the brake pedal 14 performed by the driver may be generated whether the battery is in the normal state or in the abnormal state. This makes it possible to simplify the hydraulic pressure path, resulting in a simplified structure as well as reduced manufacturing costs. In the case where the power source goes down, the braking force may be appropriately applied, thus improving safety.

The vehicle braking system according to the second embodiment is provided with the pressure regulating valve 81 disposed within the leading end of the cylinder 11, which includes the housing 82, the poppet valve 84 moveably supported in the housing 82 to open and close the second hydraulic pressure supply pipe 43, the fifth pressure chamber R5, and the third hydraulic pressure supply pipe 93, the compression spring 85 that urges the poppet valve 84 to the closing direction, and the pressure transmission member 86 that moves toward the input piston 12 to open the poppet valve 84. When the input piston 12 is moved to be in contact with the pressure piston 13, the communication passage 21 is closed. When the pressure piston 13 is moved to increase the pressure within the third pressure chamber R3, the pressure transmission member 86 moves the poppet valve 84. As the communication between the second hydraulic pressure supply pipe 43 and the fifth pressure chamber R5 is established, the hydraulic pressure from the accumulator 37 is regulated by the pressure regulating valve 81 so as to be applied to the first pressure chamber R1. The braking hydraulic pressures Pr and Pf, thus, may be discharged.

The position at which the pressure regulating valve 81 is installed is not limited, thus improving the degree of freedom for such installment. This makes it possible to switch the path for supplying the braking hydraulic pressure between the normal mode and the abnormal mode with the simple structure, resulting in reduced manufacturing costs.

Third Embodiment

Figure 6:
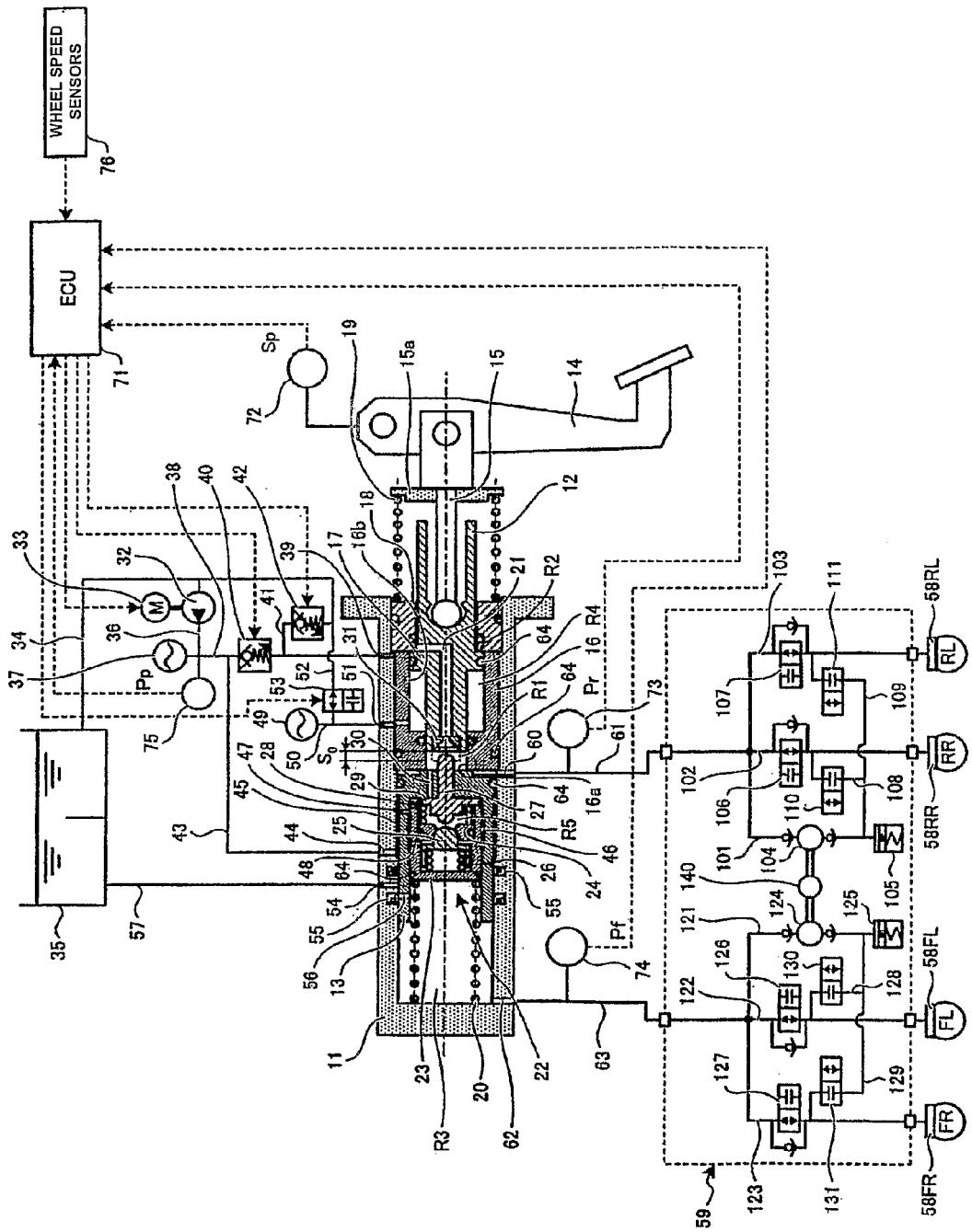
FIG. 6 is a view schematically showing a vehicle braking system according to a third embodiment of the invention.
Figure 7:
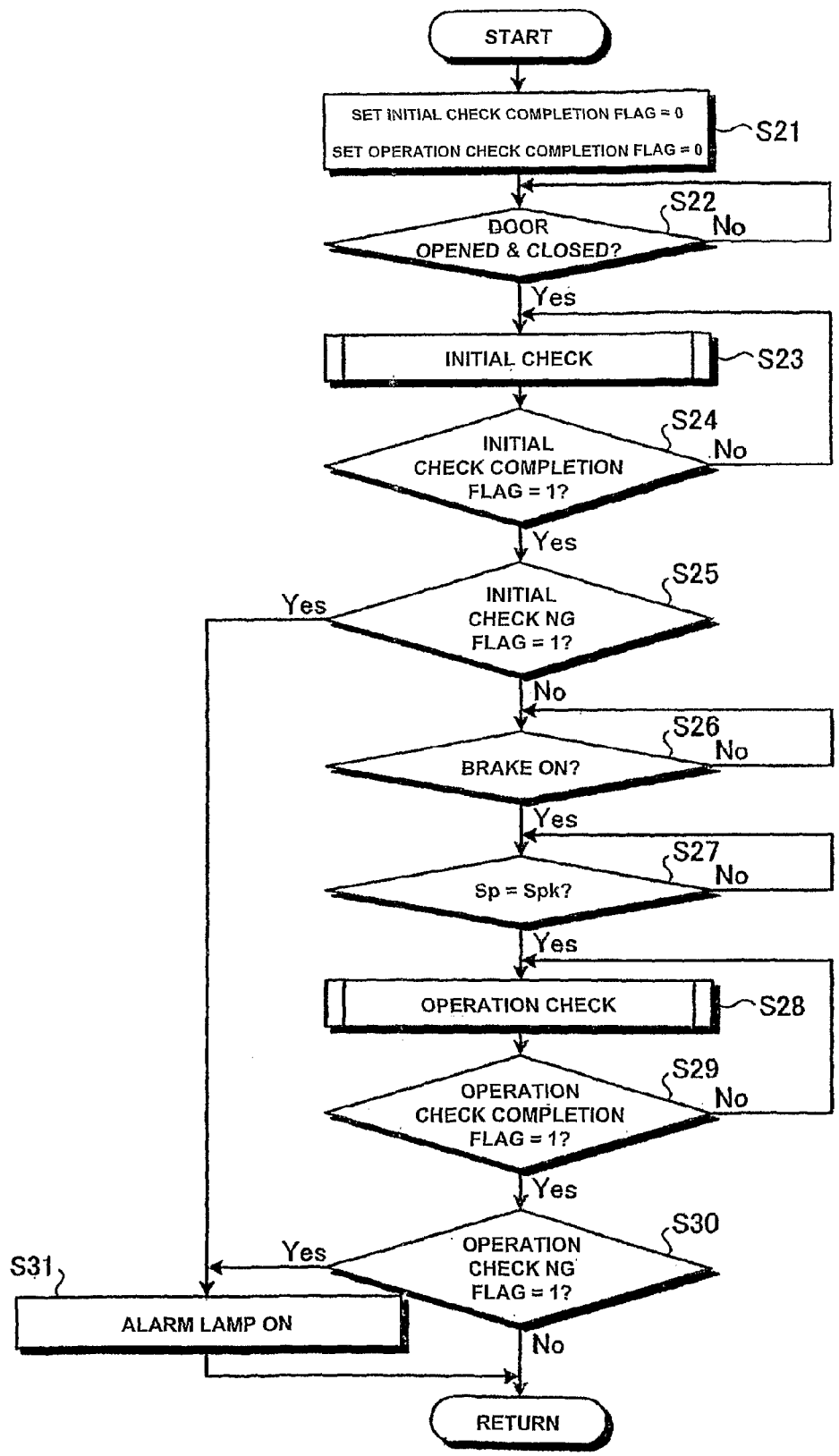
FIG. 7 is a flowchart showing the control routine for determining the operation of the pressure regulating valve in the vehicle braking system according to the third embodiment of the invention.
Figure 8:
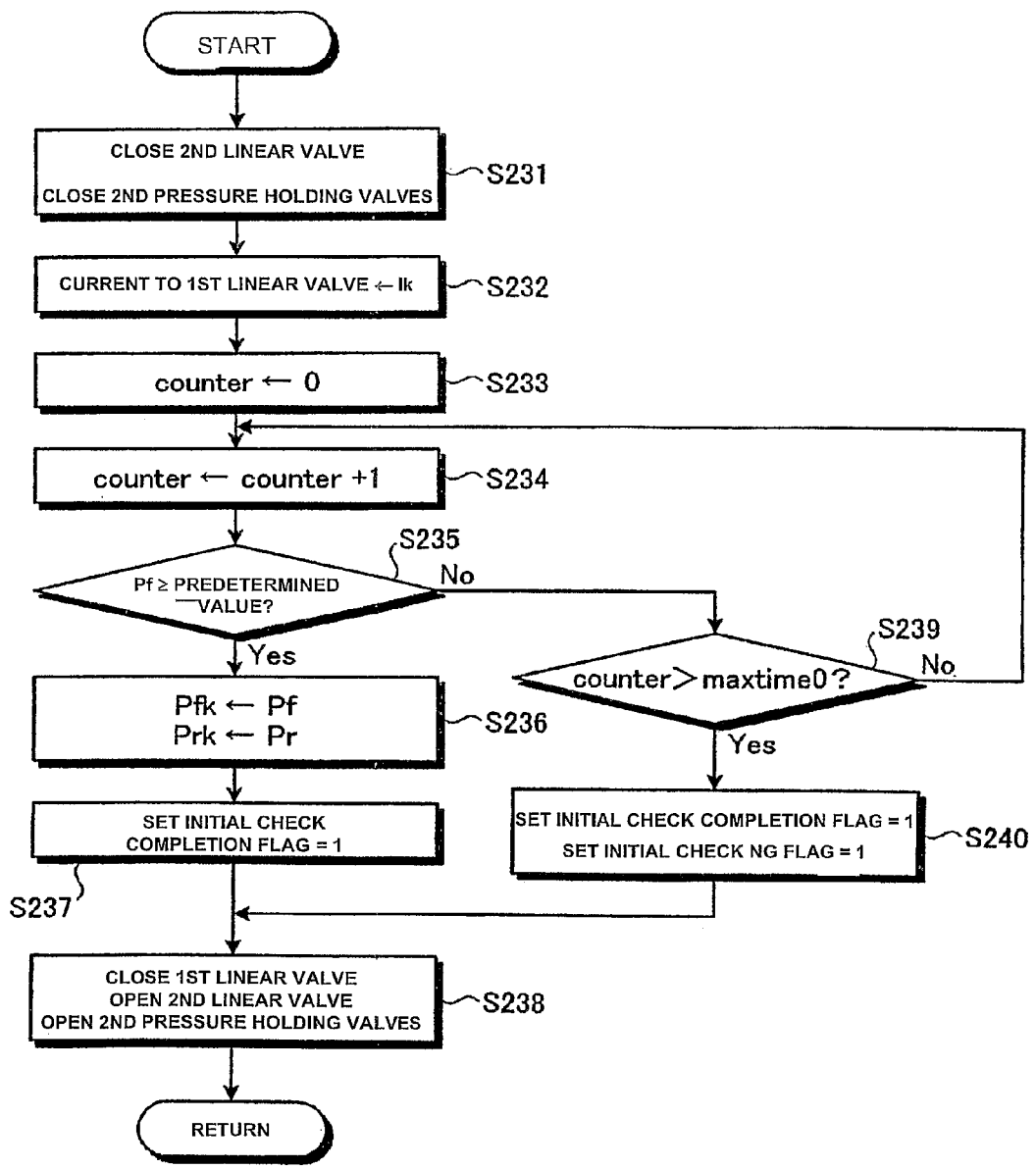
FIG. 8 is a flowchart showing the control routine for the initial check control for the pressure regulating valve in the vehicle braking system according to the third embodiment of the invention.
Figure 9:
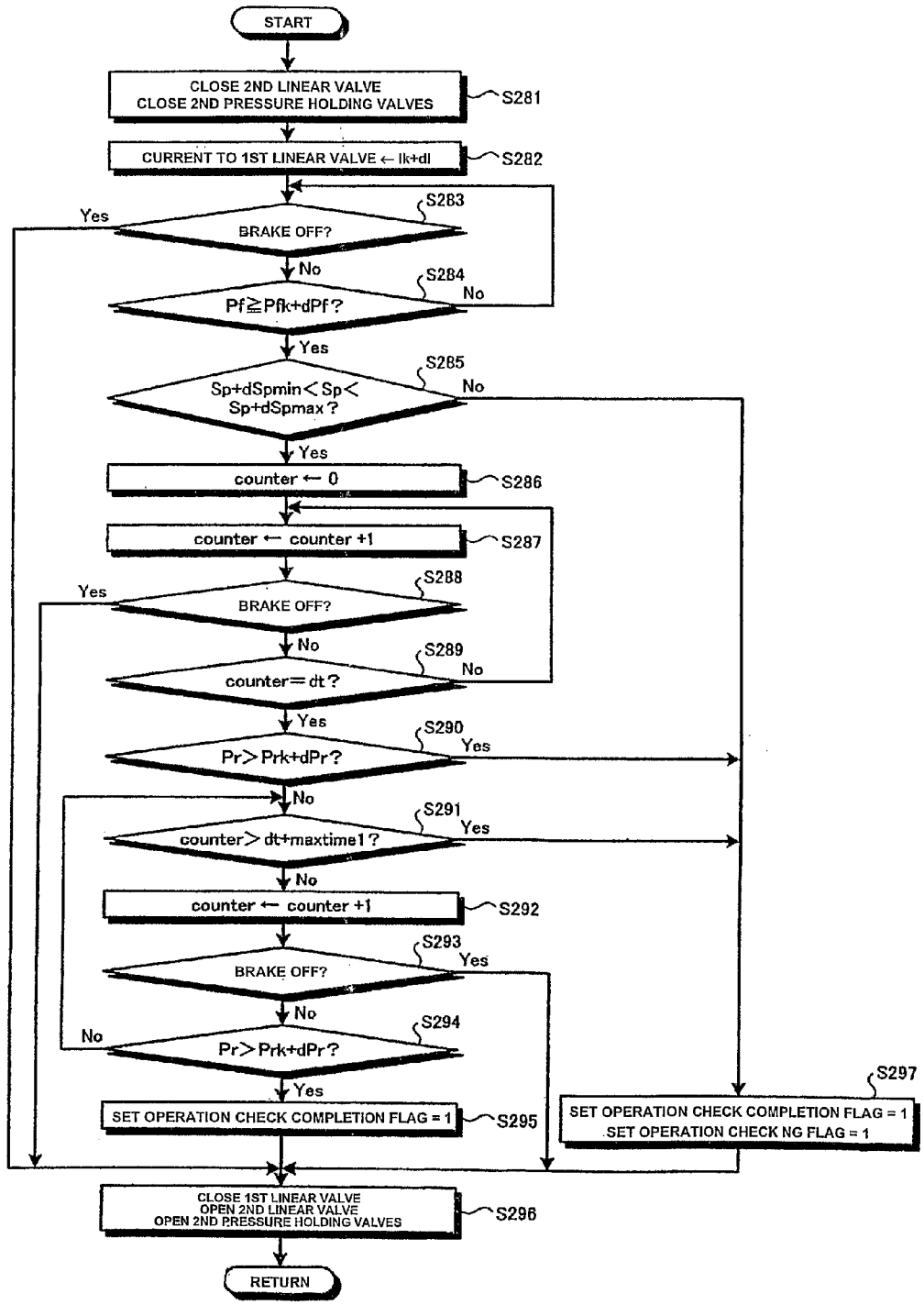
FIG. 9 is a flowchart showing the control routine for the operation check control for the pressure regulating valve in the vehicle braking system according to the third embodiment of the invention.
Figure 10:
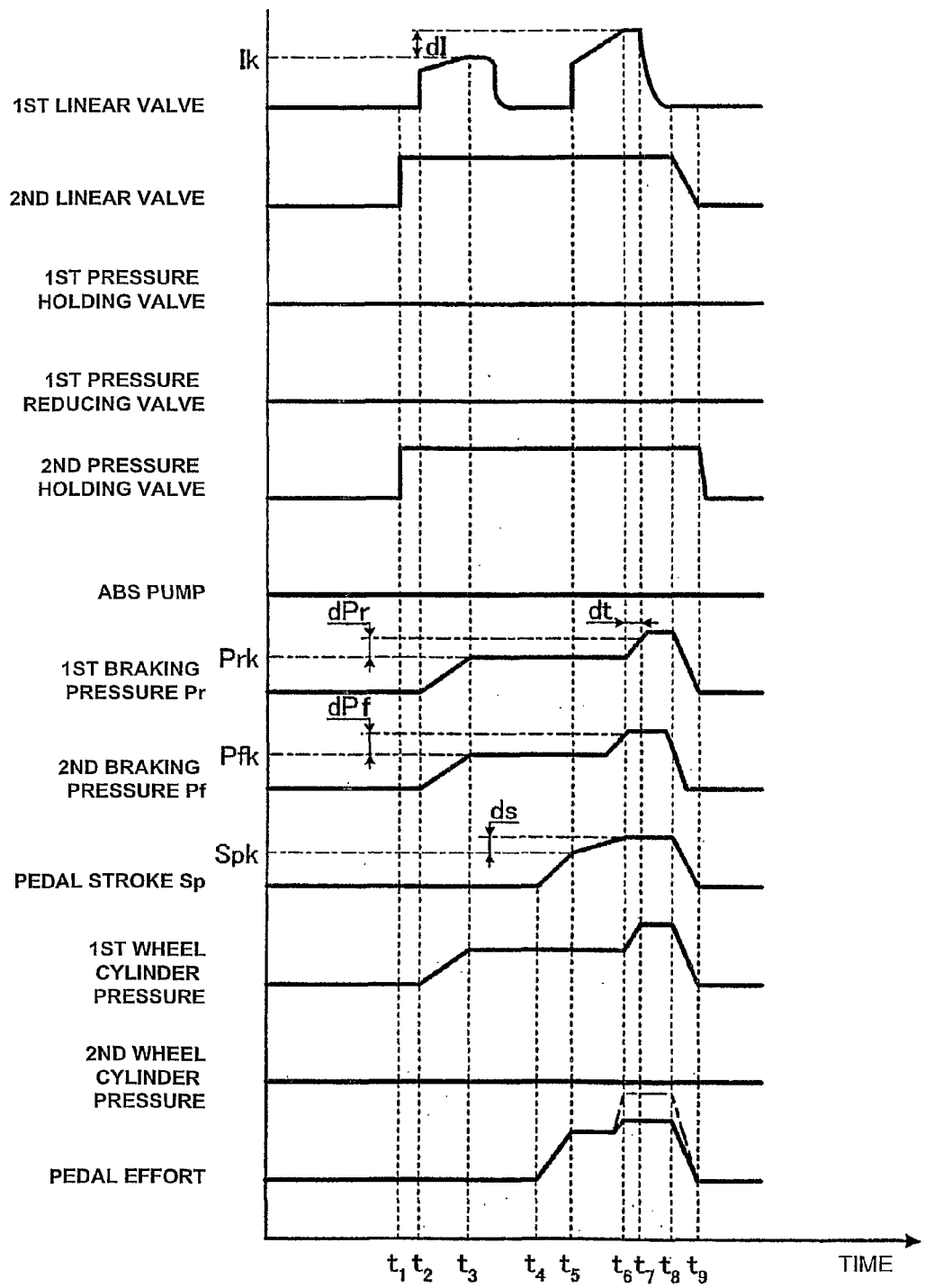
FIG. 10 is a timing chart showing the operation determination control with respect to the operation of the pressure regulating valve in the vehicle braking system according to the third embodiment of the invention.

FIG. 6 is a view schematically showing a vehicle braking system according to a third embodiment of the invention. FIG. 7 is a flowchart of a determination control routine with respect to the operation of the pressure regulating valve of the vehicle braking system according to the third embodiment. FIG. 8 is a flowchart of the control routine for initially checking the pressure regulating valve. FIG. 9 is a flowchart of the control routine for checking the operation of the pressure regulating valve. FIG. 10 is a timing chart that shows the determination control with respect to the operation of the pressure regulating valve of the vehicle braking system according to the third embodiment. The member with the same function as that described in the previous embodiments will be designated with the same reference numeral, and the explanation thereof, thus, will be omitted.

The entire structure of the vehicle braking system according to the third embodiment is substantially the same as that of the first embodiment shown in FIG. 1. In the vehicle braking system, the input piston 12 and the pressure piston 13 are moveably supported within the cylinder 11. The input piston 12 is connected to the brake pedal 14, which is allowed to depress the pressure piston 13. The pressure chambers R1 and R2 formed to the front and to the rear of the input piston 12 are communicated through the communication passage 21 such that the control hydraulic pressure in accordance with the operation amount to the brake pedal 14 may be supplied to the second pressure chamber R2 via the first and the second linear valves 40 and 42 in the normal state of the power source. Meanwhile in the abnormal state of the power source, the control hydraulic pressure in accordance with the operation amount to the brake pedal 14 that has been transmitted to the pressure piston 13 via the input piston 12 is regulated by the pressure regulating valve 22. The hydraulic pressure, thus, may be supplied to the second pressure chamber R2 so as to allow the pressure chambers R1 and R3 to output the braking hydraulic pressures Pr and Pf, respectively.

In the afore-mentioned case, the first hydraulic pressure discharge pipe 61 connected to the first discharge port 60 of the first pressure chamber R1 is branched into three paths, that is, 101, 102, and 103 in the ABS 59. The first path 101 is connected to an ABS accumulator 104 and an ABS reservoir tank 105. The second and the third paths 102 and 103 are connected to the wheel cylinders 58RR and 58RL of the rear wheels RR and RL, respectively, and provided with the first pressure holding valves 106 and 107 therein. The second and the third paths 102 and 103 further include first and second branch paths 108 and 109 downstream of the pressure holding valves 106 and 107, respectively, which are connected to the ABS reservoir tank 105 and provided with first pressure reducing valves 110 and 111 therein.

The second hydraulic pressure discharge pipe 63 connected to the second discharge port 62 of the third pressure chamber R3 is branched into three paths, that is, 121, 122 and 123. The first path 121 is connected to an ABS accumulator 124 and an ABS reservoir tank 125. The second and the third paths 122 and 123 are connected to the wheel cylinders 58FL and 58FR of the front wheels FL and FR, and provided with second pressure holding valves 126 and 127, respectively. The second and the third paths 122 and 123 include first and second branch paths 128 and 129 downstream of the pressure holding valves 126 and 127, which are connected to the ABS reservoir tank 125 and provided with second pressure reducing valves 130 and 131 therein. An ABS pump motor 140 is connected to the ABS accumulators 104 and 124.

In the thus structured vehicle braking system according to the third embodiment, the ECU 71 as the normal operation determination unit allows the control hydraulic pressure to be applied to the input piston 12 via the first and the second linear valves 40 and 42 so as to move the pressure piston 13 through the input piston 12. The ECU 71 makes the determination with respect to the normal operation of the pressure regulating valve 22 serving to mechanically supply the hydraulic pressure by forcibly operating the pressure regulating valve 22 so as to detect the resultant braking hydraulic pressure.

The control routine with respect to the determination of the pressure regulating valve operation in the vehicle braking system according to the third embodiment will be described in detail hereinafter.

In the control routine for determining the pressure regulating valve operation in the vehicle braking system, first in step S21 of the flowchart shown in FIG. 7, both the initial check completion flag and the operation check completion flag are set to 0. Then in step S22, it is determined whether the vehicle door has been opened and closed to make sure that the driver intends to start the vehicle by confirming the opening and closing operations of the vehicle door. If it is determined that the door has been opened and closed in step S22, the process proceeds to step S23 where the initial check of the pressure regulating valve 22 is performed.

In the initial check of the pressure regulating valve 22, the second linear valve 42 is closed, and the second pressure holding valves 126 and 127 are also closed in step S231 as shown in the flowchart of FIG. 8. Upon the initial check of the pressure regulating valve 22, discharge of the hydraulic pressure from the first pressure chamber R1 is interrupted, and the discharge side of the braking hydraulic pressure from the third pressure chamber R3 is closed to reduce the operation stroke of the pressure piston 13. Then in step S232, the control current applied to the first linear valve 40 is set to Ik so as to be opened to the desired opening degree.

In step S233, the counter value is set to 0, and then in step S234, the counter is incremented by 1. In step S235, it is determined whether the braking hydraulic pressure Pf detected by the second pressure sensor 74 has been increased to be equal to or higher than a predetermined value. If the first linear valve 40 is opened to apply the control hydraulic pressure to the first pressure chamber R1, and the pressure piston 13 is moved forward to pressurize the third pressure chamber R3 so as to increase the braking hydraulic pressure Pf to be equal to or higher than the predetermined value, the process proceeds to step S236. In step S236, the braking hydraulic pressures Pf and Pr are increased to specified braking hydraulic pressure values Pfk and Prk, respectively. Then in step S237, the initial check completion flag is set to 1, and in step S238, the first linear valve 40 is closed, the second linear valve 42 is opened, and the second pressure holding valves 126 and 127 are opened, respectively.

In step S235, if the braking hydraulic pressure Pf has not been increased to be equal to or higher than the predetermined value, the process proceeds to step S239 where it is determined whether the counter value is larger than the threshold value maxtime0. If it is determined that the counter value is equal to or smaller than the threshold value maxtime0, the process returns to step S234. If the braking hydraulic pressure Pf has not been increased to be equal to or higher than the predetermined value, and the counter value exceeds the threshold value maxtime0, the process proceeds to step S240 where the initial check completion flag is set to 1, and the initial check NG flag is set to 1. In step S238, the first linear valve 40 is closed, and the second linear valve 42 is opened so as to open the second pressure holding valves 126 and 127.

Upon confirmation that the driver intends to start the vehicle by opening and closing the vehicle door, the initial check of the pressure regulating valve is performed to complete the pre-pressurization under the operation check of the pressure regulating valve to be executed subsequently. The operation check of the pressure regulating valve, thus, may be executed safely.

Referring back to FIG. 7, the initial check of the pressure regulating valve 22 is executed in step S23, and in step S24, the program is held standby until the initial check completion flag is set to 1. When the initial check completion flag is set to 1, the process proceeds to step S25 where it is determined whether the initial check NG flag is set to 1. If the initial check NG flag is not set to 1, and the initial check is appropriately completed, the process proceeds to step S26 where it is determined whether the braking has been performed based on the pedal stroke Sp of the brake pedal 14 detected by the stroke sensor 72. If it is determined that a braking operation has been performed in step S26, the process proceeds to step S27 where it is determined whether the pedal stroke Sp of the brake pedal 14 becomes the specified value Spk. If the pedal stroke Sp is equal to the specified value Spk, the process proceeds to step S28 where the operation check of the pressure regulating valve 22 is executed.

Before execution of the operation check of the pressure regulating valve 22, it is confirmed whether the driver has depressed the brake pedal 14, and the resultant pedal stroke Sp becomes the specified value Spk such that the pedal reaction force upon operation of the pressure regulating valve 22 may be reduced.

Upon execution of the operation check of the pressure regulating valve 22, in step S281 of the flowchart shown in FIG. 9, the second linear valve 42 is closed, and the second pressure holding valves 126 and 127 are closed. Then in step S282, the control current applied to the first linear valve 40 is set to Ik+dI so as to be opened to the desired opening degree. In step S283, it is determined whether the braking operation has been finished based on the pedal stroke Sp of the brake pedal 14 detected by the stroke sensor 72. If it is determined that the brake operation has been finished, the process proceeds to step S296 although it is in the middle of the operation check of the pressure regulating valve 22. In step S296, the first linear valve 40 is closed, the second linear valve 42 is opened, and the second pressure holding valves 126 and 127 are opened to complete the operation check.

If it is determined that the brake operation has not been finished in step S283, the process proceeds to step S284 where it is determined whether the braking hydraulic pressure Pf detected by the second pressure sensor 74 has been increased to be equal to or higher than a reference braking hydraulic pressure Pfk+dPf. If it is determined that the braking hydraulic pressure Pf has been increased to be equal to or higher than the reference braking hydraulic pressure Pfk+dPf, the process proceeds to step S285 where it is determined whether the pedal stroke Sp of the brake pedal 14 is in the reference operation range (Sp+dSpmin<Sp<Sp+dSpmax). If it is determined that the pedal stroke Sp is in the reference operation range, the process proceeds to step S286 where the counter value is set to 0, and then in step S287, the counter value is incremented by 1.

Then in step S288, it is determined whether the brake operation has been finished based on the pedal stroke Sp of the brake pedal 14 detected by the stroke sensor 72 again. If it is determined that the brake operation has been finished, the process proceeds to step S296 although it is in the middle of the operation check of the pressure regulating valve 22. In step S296, the first linear valve 40 is closed, the second linear valve 42 is opened, and the second pressure holding valves 126 and 127 are opened to complete the operation check.

If it is determined that the brake operation has not been finished in step S288, the process proceeds to step S289 where it is determined whether the counter value has reached the waiting time dt. If it has not reached the waiting time dt, the process returns to step S287. If it has reached the waiting time dt, the process proceeds to step S290 where it is determined whether the braking hydraulic pressure Pr detected by the first pressure sensor 73 has been increased to exceed a predetermined reference braking hydraulic pressure Prk+dPr. If it is determined that the braking hydraulic pressure Pr has not been increased to exceed the reference braking hydraulic pressure Prk+dPr, the process proceeds to step S291 where it is determined whether the counter value is larger than the value obtained by adding the threshold value maxtime1 to the waiting time dt. If the counter value is equal to or smaller than the value obtained by adding the threshold value maxtime1 to the waiting time dt, the process proceeds to step S292 where the counter value is incremented.

In step S293, it is determined whether the brake operation has been finished based on the pedal stroke Sp of the brake pedal 14 detected by the stroke sensor 72 again. If it is determined that the brake operation has been finished, the process proceeds to step S296 where the same process as described above is executed to complete the operation check.

Meanwhile, if it is determined that the brake operation has not been finished in step S293, the process proceeds to step S294 where it is determined whether the braking hydraulic pressure Pr detected by the first pressure sensor 73 has been increased to exceed the reference braking hydraulic pressure Prk+dPr. If the braking hydraulic pressure Pr has not been increased to exceed the reference braking hydraulic pressure Prk+dPr, the process returns to step S291. If the braking hydraulic pressure Pr has been increased to exceed the reference braking hydraulic pressure Prk+dPr, the process proceeds to step S295 where the operation check completion flag is set to 1, and then in step S296, the same process as described above is executed to complete the operation check.

In the case where it is determined that the braking hydraulic pressure Pf has been increased to be equal to or higher than the reference braking hydraulic pressure Pfk+dPf, and it is determined that the pedal stroke Sp is not in the reference operation range in step S285, the process proceeds to step S297 where the operation check completion flag and the operation check NG flag are set to 1, respectively. The process proceeds to step S296 where the same process as described above is executed to complete the operation check. If the counter value has reached the waiting time dt, and it is determined in Step S290 that the braking hydraulic pressure Pr detected by the first pressure sensor 73 has been increased to exceed the predetermined reference braking hydraulic pressure Prk+dPr, the process proceeds to step S297 where the operation check completion flag and the operation check NG flag are set to 1, respectively. The process then proceeds to step S296 where the same process as described above is executed to complete the operation check. If it is determined that the braking hydraulic pressure Pr has not been increased to exceed the reference braking hydraulic pressure Prk+dPr, the process proceeds to step S291 where it is determined whether the counter value becomes larger than the value obtained by adding the threshold value maxtime1 to the waiting time dt. If the counter value becomes larger than the value dt+maxtime1, the process proceeds to step S297 where the operation check completion flag and the operation check NG flag are set to 1, respectively. The process then proceeds to step S296 where the same process as described above is executed to complete the operation check.

It is determined that the pressure regulating valve 22 is normally operated if:
  the braking hydraulic pressure Pf has been increased to be equal to or higher than the reference braking hydraulic pressure Pfk+dPf;
  the pedal stroke Sp of the brake pedal 14 at that time is in the reference operation range (Sp+dSpmin<Sp<Sp+dSpmax); and
  the braking hydraulic pressure Pr has been increased to be higher than the reference braking hydraulic pressure Prk+dPr after an elapse of the waiting time dt.

That is, when the driver depresses the brake pedal 14, the input piston 12 is moved forward to be in contact with the load transmission member 27 of the pressure regulating valve 22 to close the communication passage 21. The load transmission member 27 displaces to move the poppet valve 25 to establish the communication between the second hydraulic pressure supply pipe 43 and the fifth pressure chamber R5. The hydraulic pressure of the accumulator 37 is applied to the first pressure chamber R1 through the pressure regulating valve 22 so as to discharge the braking hydraulic pressures Pr and Pf. If the simulation is made to create the afore-mentioned state before start-up of the vehicle so as to compare the braking hydraulic pressures Pr and Pf, and the pedal stroke Sp with the respective reference values, appropriate operation of the pressure regulating valve 22, that is, the poppet valve 25 may be confirmed.

Referring back to FIG. 7, the operation check of the pressure regulating valve 22 is executed in step S28, and in step S29, the operation is kept standby until the operation check completion flag becomes 1. When the operation check completion flag becomes 1, the process proceeds to step S30 where it is determined whether the operation check NG flag has been set to 1. If the operation check NG flag is not set to 1, and the operation check is appropriately completed, the control for determining the operation of the pressure regulating valve 22 ends. Meanwhile, if the initial check NG flag is set to 1 in step S25, or the operation check NG flag is set to 1 in step S30, the process proceeds to step S31 where the alarm lamp is turned ON so as to alert the driver.

The control for determining with respect to the pressure regulating valve operation in the third embodiment as described above will be described based on the timing chart shown in FIG. 10.

Under the pressure regulating valve operation determination control executed in the vehicle braking system, at a time point t1 when it is confirmed that the driver intends to start the vehicle based on the opening and closing operation of the vehicle door, the second linear valve 42 is closed, and the second pressure holding valves 126, 127 are closed. At a time point t2 when the first linear valve 40 is opened to the predetermined opening degree, the first and the second braking hydraulic pressures Pr and Pf are increased, and only the first wheel cylinder pressure is increased. As the second pressure holding valves 126, 127 are closed, the second wheel cylinder pressure is not increased. At a time point t3, the respective braking hydraulic pressures Pf and Pr are increased to reach the specified braking hydraulic pressures Pfk and Prk, respectively, which will be kept constant subsequently.

When the driver depresses the brake pedal 14 at a time point t4, the pedal stroke Sp increases and the pedal effort is generated. When the pedal stroke Sp becomes the specified value Spk at a time point t5, the control current applied to the first linear valve 40 is set to Ik+dI to increase the opening degree so as to make the pedal effort constant. Then, the braking hydraulic pressures Pf and Pr increase sequentially. Then at a time point t6, the braking hydraulic pressure Pf increases to be equal to or higher than the reference braking hydraulic pressure Pfk+dPf, and the pedal stroke Sp is in the reference operation range (Sp+dSpmin<Sp<Sp+dSpmax). At a time point t7 after an elapse of the waiting time dt, the braking hydraulic pressure Pr increases to exceed the reference braking hydraulic pressure Prk+dPr. As the control current applied to the first linear valve 40 is set to Ik+dI to increase the opening degree, the actual pedal effort is reduced to be lower than the one as shown by the chain double-dashed line, thus keeping the driver from having discomfort feel.

When the first linear valve 40 is closed, and the second linear valve 42 is opened at a time point t8, the braking hydraulic pressures Pf and Pr decrease sequentially. When the braking hydraulic pressures Pf and Pr become 0 at a time point t9, the second pressure holding valves 126 and 127 are opened to complete the operation check.

In the vehicle braking system according to the third embodiment, upon depression of the brake pedal 14 performed by the driver, the ECU 71 as the normal operation determination unit applies the control hydraulic pressure to the input piston 12 via the first and the second linear valves 40 and 42. As the input piston 12 and the pressure piston 13 are moved together to forcibly operate the pressure regulating valve 22 as the mechanical hydraulic pressure supply unit.

The resultant braking hydraulic pressure is detected to determine with respect to the normal operation of the pressure regulating valve 22.

This makes it possible to easily make a determination with respect to the operation of the pressure regulating valve 22 that is not operated in the normal state of the battery, thus improving safety.

In the vehicle braking system of the third embodiment, the ECU 71 closes the second linear valve 42, and opens the first linear valve 40 to apply the predetermined control hydraulic pressure to the input piston 12 before start-up of the vehicle. This may allow the determination to be made with respect to the normal operation of the pressure regulating valve 22 when the braking hydraulic pressure Pf is equal to or higher than the reference braking hydraulic pressure Pfk+dPF, and the pedal stroke Sp is in the reference operation range (Sp+dSpmin<Sp<Sp+dSpmax) upon depression of the brake pedal 14 performed by the driver.

This makes sure to determine the normal operation of the pressure regulating valve 22 based on the braking hydraulic pressure Pf and the pedal stroke Sp. The pedal reaction force of the brake pedal 14 may be reduced so as to improve the operation frequency as well as the feel during the operation.

When the braking hydraulic pressure Pf becomes equal to or higher than the reference braking hydraulic pressure Pfk+dPf, and the pedal stroke Sp is in the reference operation range (Sp+dSpmin<Sp<Sp+dSpmax), and then the braking hydraulic pressure Pr has increased to exceed the reference braking hydraulic pressure Prk+dPr after an elapse of the waiting time dt, the determination is made with respect to the normal operation of the pressure regulating valve 22. This makes sure to determine the normal operation of the pressure regulating valve 22 by detecting the pressure increase in the braking hydraulic pressure Pf and subsequent hydraulic pressure Pr.

In the vehicle braking system of the embodiment, the ECU 71 closes the second linear valve 42, and opens the first linear valve 40 so as to apply the predetermined control hydraulic pressure to the input piston 12, and closes the second pressure holding valves 126 and 127 of the discharge line 63 of the braking hydraulic pressure Pf from the third pressure chamber R3 to the ABS 59. This makes it possible to obtain the predetermined braking hydraulic pressure Pf without requiring the stroke of the pressure piston 13 to be greater, resulting in an improved operation feel.

Fourth Embodiment

Figure 11:
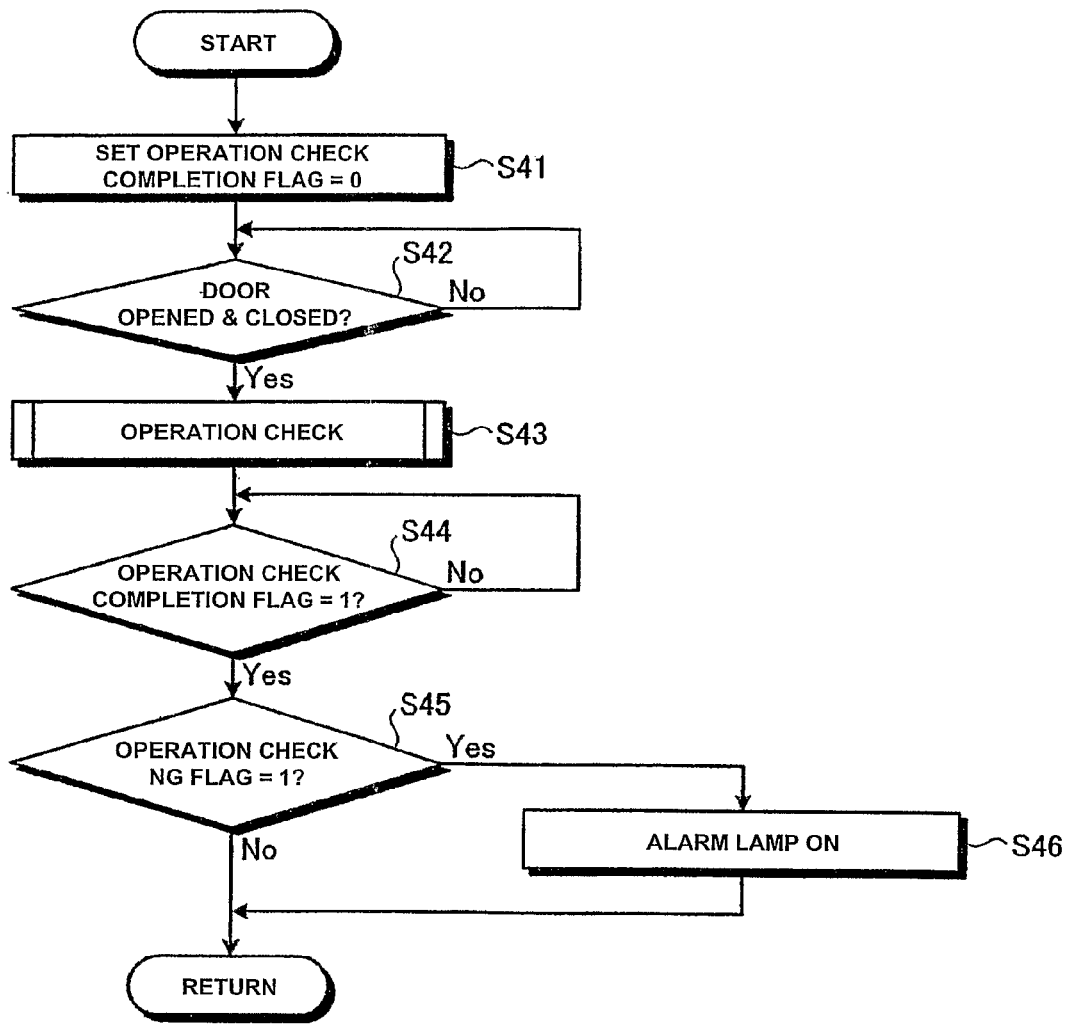
FIG. 11 is a flowchart showing the operation determination control with respect to the operation of the pressure regulating valve in a vehicle braking system according to a fourth embodiment of the invention.
Figure 12:
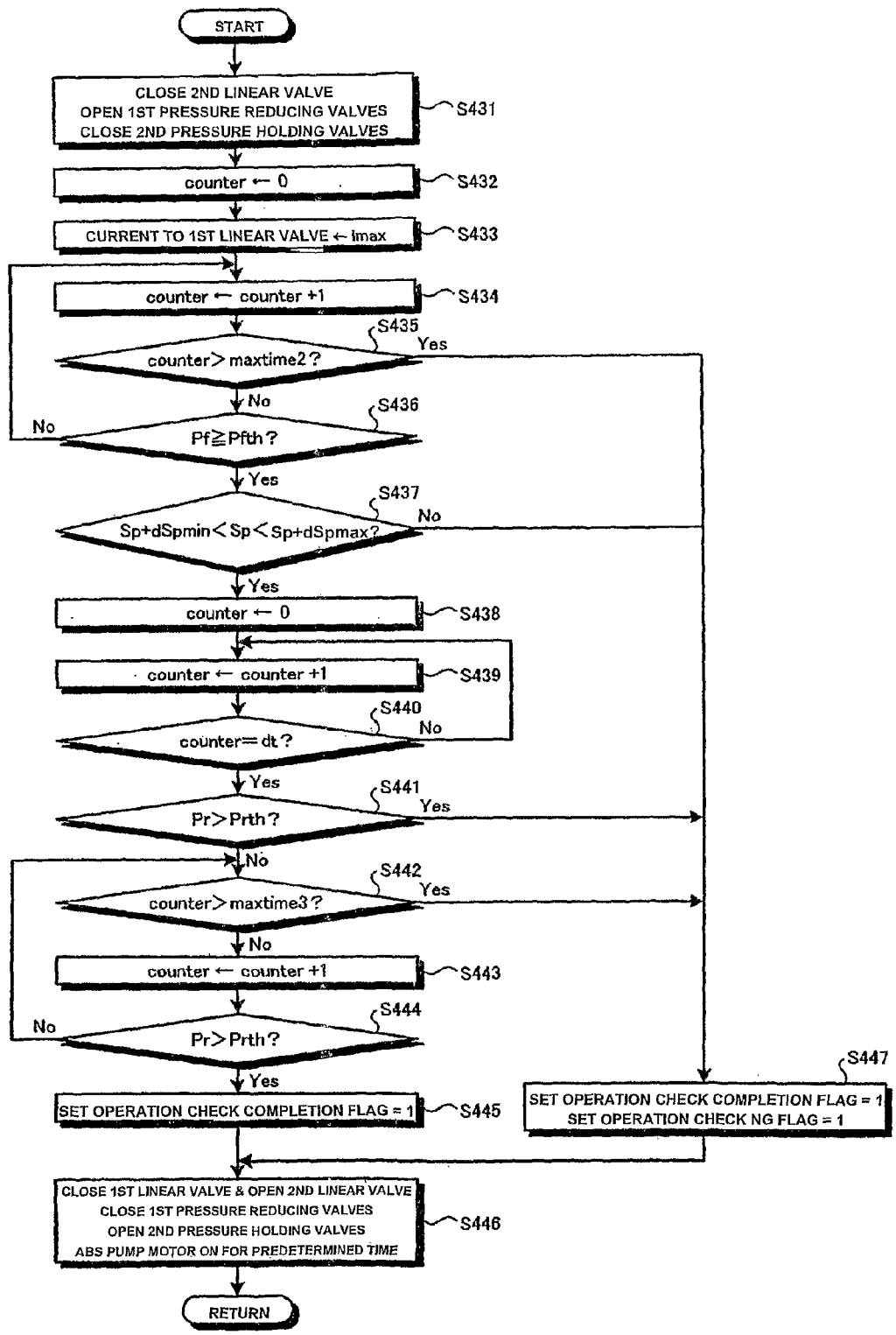
FIG. 12 is a flowchart showing the operation check control with respect to the pressure regulating valve in the vehicle braking system according to the fourth embodiment of the invention.
Figure 13:
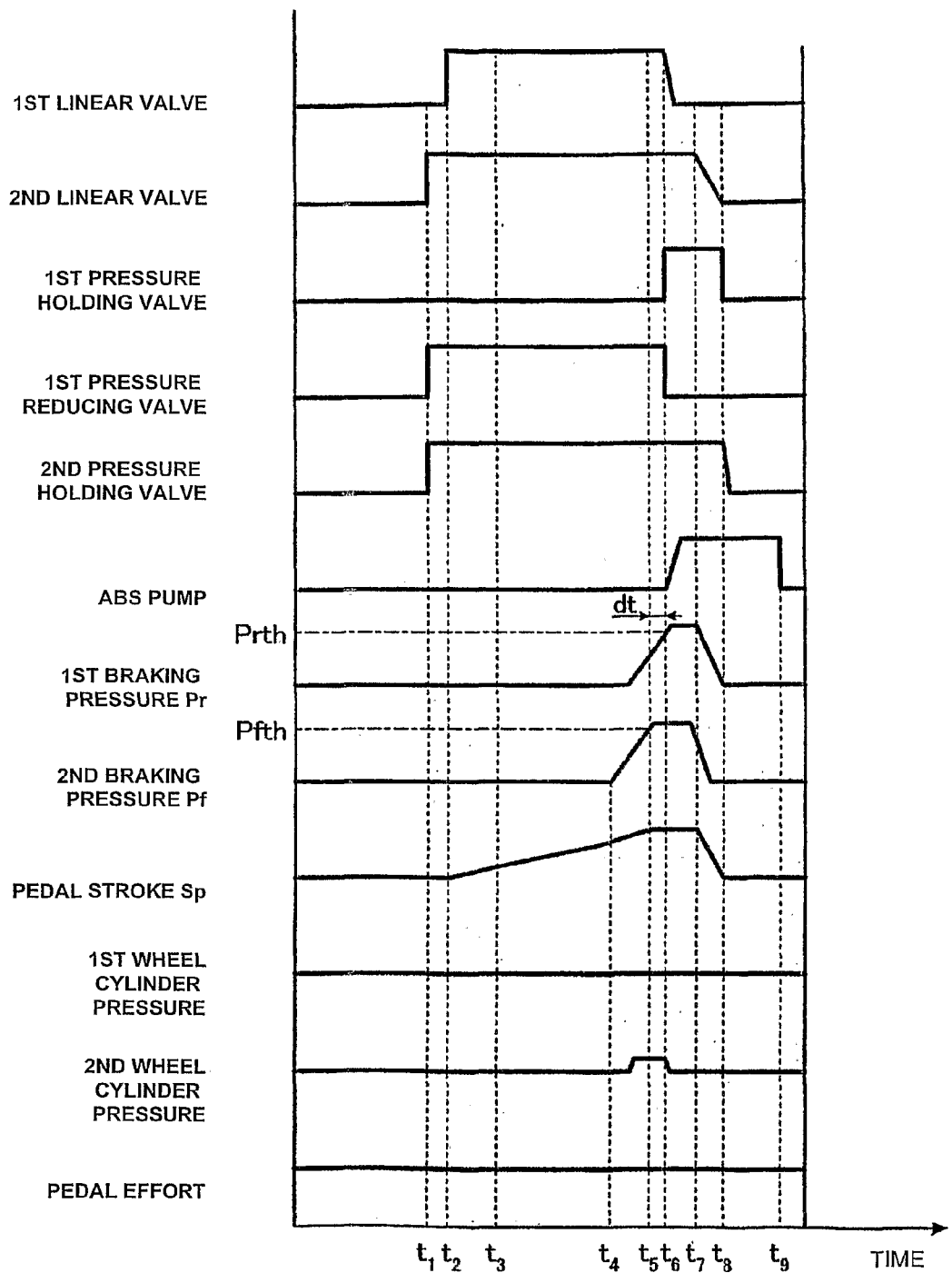
FIG. 13 is a timing chart showing the operation determination control with respect to the pressure regulating valve in the vehicle braking system according to the fourth embodiment of the invention.
Figure 14:
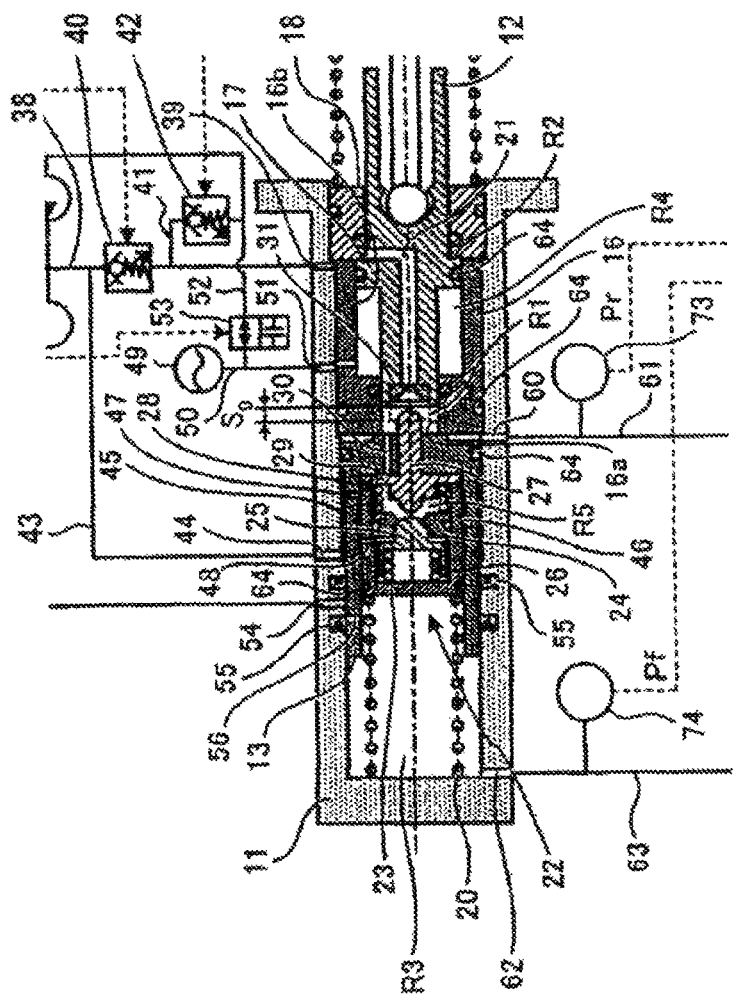
FIG. 14 is an enlarged view of the cylinder illustrated in FIG. 1.

FIG. 11 is a flowchart of a determination control routine with respect to the operation of the pressure regulating valve in a vehicle braking system according to a fourth embodiment. FIG. 12 is a flowchart of the control routine for the operation check of the pressure regulating valve. FIG. 13 is a timing chart that shows the determination control routine with respect to the operation of the pressure regulating valve in the vehicle braking system according to the fourth embodiment. The entire structure of the vehicle braking system of the fourth embodiment is substantially the same as that of the third embodiment. The explanation will be made referring to FIG. 6, and the member with the same function as that described in the embodiment will be designated with the same reference numeral, and the explanation thereof, thus, will be omitted.

As the entire structure of the vehicle braking system of the fourth embodiment is substantially the same as that of the third embodiment (FIG. 6), the detailed explanation will be omitted. In the vehicle braking system of the fourth embodiment, the ECU 71 as the normal operation determination unit automatically applies the control hydraulic pressure to the input piston 12 via the first and the second linear valves 40 and 42 whether or not the brake pedal 14 is depressed by the driver. The pressure piston 13 is then moved through the input piston 12 to forcibly operate the pressure regulating valve 22 as the mechanical hydraulic pressure supply unit so as to detect the braking hydraulic pressure Pf, Pr. The determination with respect to the normal operation of the pressure regulating valve 22, thus, may be made.

The control routine for determining the operation of the pressure regulating valve in the vehicle braking system of the fourth embodiment will be described in detail.

Under the determination control with respect to the operation of the pressure regulating valve in the vehicle braking system, the operation check completion flag is set to 0 in step S41 as shown in the flowchart of FIG. 11. Then in step S42, it is determined whether the door is opened and closed. In step S43, the operation check of the pressure regulating valve 22 is executed.

Upon the operation check of the pressure regulating valve 22, in step S431 shown in FIG. 12, the second linear valve 42 is closed, first pressure reducing valves 110, 111 are opened, and the second pressure holding valves 126, 127 are closed. That is, upon the operation check of the pressure regulating valve 22, discharge of the hydraulic pressure from the first pressure chamber R1 is inhibited to keep the pressure difference between the first and the second pressure chambers R1 and R2, and hydraulic pressure discharge portion of the third pressure chamber R3 is closed such that the operation stroke of the pressure piston 13 is reduced. Then in step S432, the counter value is set to 0, and in step S433, the control current applied to the first linear valve 40 is set to the Imax so as to be opened to the desired opening degree.

In step S434, the counter value is incremented by 1, and in step S435, it is determined whether the counter value becomes larger than the threshold value maxtime2. If the counter value is equal to or smaller than the threshold value maxtime 2, the process proceeds to step S436 where it is determined whether the braking hydraulic pressure Pf detected by the second pressure sensor 74 has increased to be equal to or higher than the predetermined reference braking hydraulic pressure Pfth. If it is determined that the braking hydraulic pressure Pf has been increased to be equal to or higher than the reference braking hydraulic pressure Pfth, the process proceeds to step S437 where it is determined whether the pedal stroke Sp of the brake pedal 14 is in the reference operation range (Sp+dSpmin<Sp<Sp+dSpmax). If it is determined that the pedal stroke Sp is in the reference operation range, the process proceeds to step S438 where the counter value is set to 0, and then in step S439, the counter value is incremented by 1.

In step S440, it is determined whether the counter value has reached the waiting time dt. If it is determined that the counter value has not reached the waiting time dt, the process returns to step S439. When the counter value has reached the waiting time dt, it is determined whether the braking hydraulic pressure Pr detected by the first pressure sensor 73 has been increased to exceed a predetermined reference braking hydraulic pressure Prth in step S441. If it is determined that the braking hydraulic pressure Pr has not been increased to exceed the reference braking hydraulic pressure Prth, the process proceeds to step S442 where it is determined whether the counter value becomes greater than the threshold value maxtime3. If the counter value is equal to or smaller than the threshold value maxtime3, the process proceeds to step S443 to increment the counter value.

In step S444, it is determined whether the braking hydraulic pressure Pr detected by the first pressure sensor 73 has been increased to exceed the predetermined reference braking hydraulic pressure Prth. If the braking hydraulic pressure Pr has not been increased to exceed the reference braking hydraulic pressure Prth, the process returns to step S442. If the braking hydraulic pressure Pr has been increased to exceed the reference braking hydraulic pressure Prth, the process proceeds to step S445 where the operation check completion flag is set to 1, and in step S446, the first linear valve 40 is closed, the second linear valve 42 is opened, and the first pressure reducing valves 110 and 111 are closed. When the ABS pump motor 140 is driven in the state where the first holding valves 106 and 107 are opened, the hydraulic pressure discharged into the ABS reservoir tank 105 may be returned to the first hydraulic pressure discharge pipe 61 through the accumulator 104.

When the counter value exceeds the threshold value maxtime2 in step S435, it is determined that the time is up, and then the process proceeds to step S447. In step S447, the operation check completion flag and the operation check NG flag are set to 1, and the process proceeds to step S446 where the same process as described above is executed to complete the operation check. If it is determined that the braking hydraulic pressure Pf has been increased to be equal to or higher than the reference braking hydraulic pressure Pfth in step S436, the process proceeds to step S437. If:

it is determined that the pedal stroke Sp is not in the reference operation range in step S437;
it is determined that the braking hydraulic pressure Pr has been already increased to exceed the reference braking hydraulic pressure Prth in step S441; or
it is determined that the counter value becomes larger than the threshold value maxtime3 in step S442, the process proceeds to S447 where the operation check completion flag and the operation check NG flag are set to 1, and the process proceeds to step S446 where the same process as described above is executed to complete the operation check.

The operation of the pressure regulating valve 22 may be determined as being normally performed in the case that:

the braking hydraulic pressure Pf has been increased to be equal to or higher than the reference braking hydraulic pressure Pfth;
the pedal stroke Sp of the brake pedal 14 at this time is in the reference operation range (Sp+dSpmin<Sp<Sp+dSpmax); and
the braking hydraulic pressure Pr has been increased to be higher than the reference braking hydraulic pressure Prth after an elapse of the waiting time dt.

When the operation of the vehicle by the driver is preliminarily estimated, the linear valves 40 and 42 are operated to move the input piston 12 so as to be in contact with the load transmission member 27 of the pressure regulating valve 22 to close the communication passage 21. The load transmission member 27 moves the poppet valve 25 to establish the communication between the second hydraulic pressure supply pipe 43 and the fifth pressure chamber R5 so as to apply the hydraulic pressure of the accumulator 37 to the first pressure chamber R1 through the pressure regulating valve 22. The braking hydraulic pressures Pr and Pf, thus, may be generated. If the afore-mentioned state is automatically simulated to compare the braking hydraulic pressures Pr, Pf and the pedal stroke Sp with the respective reference values, the appropriate operation of the pressure regulating valve 22, that is, the poppet valve 25 may be confirmed.

Referring back to FIG. 11, the operation check of the pressure regulating valve 22 is performed in step S43, and in step S44, the program is held standby until the operation check completion flag is set to 1. When the operation check completion flag is set to 1, the process proceeds to step S45 where it is determined whether the operation check NG flag is set to 1. If the operation check NG flag is not set to 1, and the operation check has been appropriately completed, the operation determination control with respect to the pressure regulating valve 22 ends. Meanwhile, if the operation check NG flag is set to 1, the process proceeds to step S46 where the alarm lamp is turned ON so as to alert the driver.

The operation determination control with respect to the pressure regulating valve 22 in the vehicle braking system of the aforementioned embodiment will be described referring to the timing chart shown in FIG. 13 in detail.

Under the operation determination control with respect to the pressure regulating valve 22 in the vehicle braking system, when it is confirmed that the driver intends to start the vehicle in response to the opening and closing operation of the vehicle door at a time point t1 as shown in FIG. 13, the second linear valve 42 is closed, the first pressure reducing valves 110, 111 are opened, and the second pressure holding valves 126, 127 are closed. When the first linear valve 40 is opened to the predetermined opening degree at a time point t2, the input piston is moved to increase the pedal stroke Sp. Then at a time point t4, the input piston 12 is brought into contact with the pressure piston 13 to close the communication passage 21, thus increasing the first and the second braking hydraulic pressures Pr and Pf sequentially. As the first pressure reducing valves 110 and 111 are opened, the first wheel cylinder pressure is not increased. As the second pressure holding valves 126 and 127 are closed, the second wheel cylinder pressure is not increased, either.

At a time point t5, the braking hydraulic pressure Pf has been increased to be equal to or higher than the reference braking hydraulic pressure Pfth, and the pedal stroke Sp is in the reference operation range (Sp+dSpmin<Sp<Sp+dSpmax). At a time point t6 after an elapse of the waiting time dt, the braking hydraulic pressure Pr has increased to exceed the reference braking hydraulic pressure Prth. At this time, the control current applied to the first linear valve 40 is set to 0 so as to close the first linear valve 40, a substantially low pedal effort is generated. The first pressure reducing valves 110, 111 are closed, and the first pressure holding valves 106, 107 are closed to drive the ABS pump motor 140.

When the second linear valve 42 is opened at a time point t7, the braking hydraulic pressures Pf, Pr and the pedal stroke Sp are reduced sequentially in the order. When the braking hydraulic pressure Pr and Pr are set to zero at a time point t8, the second pressure holding valves 126 and 127 are opened. At a time point t9, the ABS pump motor 140 is stopped to complete the operation check.

In the vehicle braking system according to the fourth embodiment, the ECU 71 as the normal operation determination unit applies the control hydraulic pressure to the input piston 12 via the first and the second linear valves 40 and 42. The input piston 12 is brought into contact with the pressure piston 13 to close the communication passage 21. The input piston 12 and the pressure piston 13 are moved together to forcibly operate the pressure regulating valve 22 as the mechanical hydraulic pressure supply member so as to determine with respect to the normal operation of the pressure regulating valve 22 based on the resultant braking hydraulic pressure.

As the input piston 12 is forcibly moved even if the brake pedal 14 is not depressed by the driver, the determination with respect to the operation of the pressure regulating valve 22 that is not operated in the normal state of the battery may be easily made, thus improving the safety.

In the vehicle braking system according to the fourth embodiment, before start-up of the vehicle, the second linear valve 42 is closed, and the first linear valve 40 is opened to apply the predetermined hydraulic pressure to the input piston 12. The braking hydraulic pressure Pr discharged from the first pressure chamber R1 is released into the reservoir tank 105 so as to close the second pressure holding valves 126 and 127 in the discharge line 63 of the braking hydraulic pressure Pf from the third pressure chamber R3 to the ABS 59.

Upon the operation check of the pressure regulating valve 22, release of the hydraulic pressure Pr from the first pressure chamber R1 is interrupted to obtain the differential pressure between the first pressure chamber R1 and the second pressure chamber R2, and to reduce the operation stroke of the pressure piston 13 by closing the side at which the braking hydraulic pressure is discharged from the third pressure chamber R3. This makes sure to obtain the predetermined braking hydraulic pressure Pf without increasing the stroke of the pressure piston 13. This may improve the operation feel, and prevent the impairment of the leg of the driver through the brake pedal 14.

In the fourth embodiment, after the completion of the determination with respect to the operation of the pressure regulating valve 22, the first pressure reducing valves 110 and 111 are closed, and the first pressure holding valves 106 and 107 are opened such that the ABS pump motor 140 is driven for a predetermined period of time. The hydraulic pressure released into the ABS reservoir tank 105 may be returned to the first hydraulic pressure discharge pipe 61 through the accumulator 104.

In the respective embodiments, the first pressure chamber R1 is connected to the wheel cylinders 58RR and 58RL of the rear wheels RR and RL, respectively through the first hydraulic pressure discharge pipe 61. The third pressure chamber R3 is connected to the wheel cylinders 58FR and 58FL of the front wheels FR and FL through the second hydraulic pressure discharge pipe 63. However, the first pressure chamber R1 may be connected to the wheel cylinders 58FR and 58FL of the front wheels FR and FL, and the third pressure chamber R3 may be connected to the wheel cylinders 58RR and 58RL of the rear wheels RR and RL.

The vehicle braking system according to the invention is allowed to apply the braking force appropriately even if the power source goes down, resulting in the improved safety, and may be applicable to any type of the braking device.

The invention claimed is:

1. A vehicle braking system comprising:
   an input piston moveably supported within a cylinder along an axial direction;
   an operation portion connected to the input piston;
   a pressure piston provided coaxially with the input piston, moveably supported within the cylinder along its axial direction, which is allowed to be depressed by the input piston;
   a control hydraulic pressure setting unit that sets a control hydraulic pressure according to an operation amount inputted from the operation portion to the input piston;
   an electromagnetic hydraulic pressure supply unit that regulates a hydraulic pressure supplied from a hydraulic pressure supply source to the control hydraulic pressure so as to be applied to the input piston and the pressure piston such that a braking hydraulic pressure is generated;
   a mechanical hydraulic pressure supply unit that regulates the hydraulic pressure supplied from the hydraulic pressure supply source to the control hydraulic pressure according to the operation amount transmitted from the operation portion to the pressure piston through the input piston so as to be applied to the pressure piston such that the braking hydraulic pressure is generated; and
   an operation force absorbing unit that absorbs an operation force input from the operation portion to the input piston, wherein
   the electromagnetic hydraulic pressure supply unit is capable of supplying the control hydraulic pressure to one of a first pressure chamber and a second pressure chamber in a moving direction of the input piston, and
   the operation force absorbing unit includes a communication passage formed in the input piston, through which a compression fluid is supplied and released between the first pressure chamber and the second pressure chamber.

2. The vehicle braking system according to claim 1, wherein either the electromagnetic hydraulic pressure supply unit or the mechanical hydraulic pressure supply unit regulates the control hydraulic pressure.

3. The vehicle braking system according to claim 1, wherein the mechanical hydraulic pressure supply unit does not regulate the control hydraulic pressure as long as the electromagnetic hydraulic pressure supply unit is regulating the control hydraulic pressure.

4. The vehicle braking system according to claim 1, wherein the communication passage includes a portion having its diameter reduced.

5. The vehicle braking system according to claim 1, wherein:
   the electromagnetic hydraulic pressure supply unit includes a first hydraulic pressure supply line connected between the hydraulic pressure supply source and one of the first and the second pressure chambers, a first electromagnetic valve which is provided in the first hydraulic pressure supply line, and closed in a state where an electric current is not supplied, a first hydraulic pressure exhaust line which is connected between one of the first and the second pressure chambers and a reservoir, and a second electromagnetic valve which is provided in the first hydraulic pressure exhaust line, and opened in the state where the electric current is not supplied, and
   the electromagnetic hydraulic pressure supply unit regulates the hydraulic pressure supplied from the hydraulic pressure supply source to the control hydraulic pressure by adjusting opening degrees of the first and the second electromagnetic valves.

6. The vehicle braking system according to claim 1, wherein:
   the mechanical hydraulic pressure supply unit includes a pressure regulating valve which is operated in response to a depression to the pressure piston performed by the input piston upon operation of the operation portion, a second hydraulic pressure supply line connected between the hydraulic pressure supply source and the pressure regulating valve, and a third hydraulic pressure supply line that connects the pressure regulating valve and the first pressure chamber; and
   an opening degree of the pressure regulating valve is adjusted by operating the operation portion to regulate the hydraulic pressure supplied from the hydraulic pressure supply source to the control hydraulic pressure.

7. The vehicle braking system according to claim 6, wherein:
the communication passage is closed when the input piston is moved to be close to the pressure piston by operating the operation portion;
the mechanical hydraulic pressure supply unit applies the control hydraulic pressure regulated by the pressure regulating valve to generate the braking hydraulic pressure; and
the communication passage is opened when the input piston is moved away from the pressure piston by operating the operation portion such that the braking hydraulic pressure is reduced.

8. The vehicle braking system according to claim 6, wherein the pressure regulating valve includes a poppet valve that closes and opens the second and the third hydraulic pressure supply lines, an urging member that urges the poppet valve into a closing direction, and a moveable member that is moved by the operation of the operation portion to open the poppet valve.

9. The vehicle braking system according to claim 6, wherein the pressure regulating valve is accommodated in the pressure piston, and the third hydraulic pressure supply line is provided within the cylinder.

10. The vehicle braking system according to claim 8, wherein the communication passage is closed when the input piston is moved to be in contact with the moveable member, and the moveable member moves the poppet valve so as to establish a communication between the second and the third hydraulic pressure supply lines.

11. The vehicle braking system according to claim 8, wherein:
the pressure regulating valve is provided to a leading end of the cylinder;
the third hydraulic pressure supply line is provided outside of the cylinder;
the communication passage is closed when the input piston is moved to be in contact with the pressure piston; and
the hydraulic pressure caused by a movement of the pressure piston allows the moveable member to move the poppet valve so as to establish a communication between the second and the third hydraulic pressure supply lines.

12. The vehicle braking system according to claim 11, wherein:
a switching valve is provided in the third hydraulic pressure supply line and is opened and closed depending on a position of the poppet valve;
a second hydraulic pressure exhaust line is connected between the pressure regulating valve and a reservoir;
the third hydraulic pressure supply line is closed, and the second hydraulic pressure exhaust line is opened during an operation of the electromagnetic hydraulic pressure supply unit; and
the third hydraulic pressure supply line is opened, and the second hydraulic pressure exhaust line is closed during an operation of the mechanical hydraulic pressure supply unit.

13. The vehicle braking system according to claim 1, wherein the mechanical hydraulic pressure supply unit is not allowed to generate the braking hydraulic pressure when the control hydraulic pressure is applied to the pressure piston by the electromagnetic hydraulic pressure supply unit to generate the braking hydraulic pressure.

14. The vehicle braking system according to claim 1, wherein a first pressure receiving area of the input piston is set to be smaller than a second pressure receiving area of the pressure piston.

15. The vehicle braking system according to claim 1, further comprising a normal operation determination unit which allows the electromagnetic hydraulic pressure supply unit to apply a predetermined control hydraulic pressure to the input piston through which the pressure piston is moved to forcibly operate the mechanical hydraulic pressure supply unit, and determines with respect to a normal operation of the mechanical hydraulic pressure supply unit based on the braking hydraulic pressure.

16. The vehicle braking system according to claim 6, further comprising a normal operation determination unit which allows the electromagnetic hydraulic pressure supply unit to apply a predetermined control hydraulic pressure to the input piston so as to be moved to be close to the pressure piston such that the communication passage is closed, allows the input piston to move the pressure piston to forcibly operate the mechanical hydraulic pressure supply unit, and determines based on a generated braking hydraulic pressure whether or not the operation of the pressure regulating valve is normal.

17. The vehicle braking system according to claim 16, wherein:
the electromagnetic hydraulic pressure supply unit includes a first hydraulic pressure supply line connected between the hydraulic pressure supply source and one of the first and the second pressure chambers, a first electromagnetic valve which is provided in the first hydraulic pressure supply line, and closed in a state where an electric current is not supplied, a first hydraulic pressure exhaust line which is connected between one of the first and the second pressure chambers and a reservoir, and a second electromagnetic valve which is provided in the first hydraulic pressure exhaust line, and opened in the state where the electric current is not supplied;
the electromagnetic hydraulic pressure supply unit and the mechanical hydraulic pressure supply unit apply the control hydraulic pressure to the pressure piston to allow a first braking hydraulic pressure and a second braking hydraulic pressure to be discharged from the first pressure chamber and a third pressure chamber of the pressure piston, respectively; and
the normal operation determination unit closes the second electromagnetic valve, and opens the first electromagnetic valve before starting a vehicle to apply a predetermined control hydraulic pressure to the input piston so as to make a determination with respect to the normal operation of the pressure regulating valve upon establishment of the conditions that:
the second braking hydraulic pressure is equal to or higher than a predetermined second reference braking hydraulic pressure, and
an operation amount of the operation portion is in a predetermined reference operation range.

18. The vehicle braking system according to claim 17, wherein the normal operation determination unit determines that the operation of the pressure regulating valve is normal if the first braking hydraulic pressure is equal to or higher than a predetermined first reference braking hydraulic pressure after an elapse of a predetermined time period from a time at which the second braking hydraulic pressure becomes equal to or higher than a second reference braking hydraulic pressure, and the operation amount to the operation portion is within a reference operation range.

19. The vehicle braking system according to claim 17, wherein before starting the vehicle, the normal operation determination unit further closes a discharge line of the second braking hydraulic pressure from the third pressure chamber.

20. The vehicle braking system according to claim 17, wherein the normal operation determination unit closes the second electromagnetic valve and opens the first electromagnetic valve when the vehicle is estimated to start such that the predetermined control hydraulic pressure is applied to the input piston.

21. The vehicle braking system according to claim 17, wherein the second braking hydraulic pressure is obtained through an operation of the operation portion performed by an occupant of the vehicle.

22. The vehicle braking system according to claim 17, wherein the second braking hydraulic pressure is obtained through application of the predetermined control hydraulic pressure to the input piston.

23. The vehicle braking system according to claim 17, wherein:
the electromagnetic hydraulic pressure supply unit and the mechanical hydraulic pressure supply unit apply the control hydraulic pressure to the pressure piston to allow the first and the second braking hydraulic pressures to be discharged from the first pressure chamber and the third pressure chamber in the pressure piston;
the normal operation determination unit closes the second electromagnetic valve and opens the first electromagnetic valve when the vehicle is estimated to start so as to make a determination with respect to the normal operation of the pressure regulating valve upon establishment of conditions that: the second braking hydraulic pressure obtained through application of the predetermined control hydraulic pressure to the input piston is equal to or higher than the predetermined second reference braking hydraulic pressure, and an operation amount to the operation portion is in the predetermined reference operation range.

24. The vehicle braking system according to claim 23, wherein the normal operation determination unit determines that the operation of the pressure regulating valve is normal if the first braking hydraulic pressure is equal to or higher than a predetermined first reference braking hydraulic pressure after an elapse of a predetermined time period from a time at which the second braking hydraulic pressure becomes equal to or higher than a second reference braking hydraulic pressure, and the operation amount to the operation portion is within a reference operation range upon estimation of the vehicle start-up.

25. The vehicle braking system according to claim 23, wherein when the vehicle is estimated to start, the normal operation determination unit closes a discharge line of the second braking hydraulic pressure from the third pressure chamber so as to decompress a discharge line of the first braking hydraulic pressure from the first pressure chamber.

26. The vehicle braking system according to claim 25, wherein the normal operation determination unit stops decompression in the discharge line of the first braking hydraulic pressure from the first pressure chamber, and returns a reduced first braking hydraulic pressure to the discharge line of the first braking hydraulic pressure after completion of the determination with respect to the normal operation of the pressure regulating valve.

27. The vehicle braking system according to claim 6, wherein
the electromagnetic hydraulic pressure supply unit includes a first hydraulic pressure supply line connected between the hydraulic pressure supply source and one of the first and the second pressure chambers, a first electromagnetic valve which is provided in the first hydraulic pressure supply line, and closed in a state where an electric current is not supplied, a first hydraulic pressure exhaust line which is connected between one of the first and the second pressure chambers and a reservoir, and a second electromagnetic valve which is provided in the first hydraulic pressure exhaust line, and opened in the state where the electric current is not supplied, and
a hydraulic pressure motor serving as the hydraulic pressure supply source is stopped and the first and the second electromagnetic valves are opened to set a static pressure mode when an abnormality occurs in a supply hydraulic pressure of the second hydraulic pressure supply line.

28. The vehicle braking system according to claim 27, wherein in the static pressure mode, the hydraulic pressure motor is driven and an opening degree of the second electromagnetic valve is adjusted upon an operation of the operation portion performed by an occupant of the vehicle.

29. The vehicle braking system according to claim 1, wherein the operation force absorbing unit includes a predetermined distance between the input piston and the pressure piston.

* * * * *